United States Patent
Lee et al.

(10) Patent No.: US 9,685,160 B2
(45) Date of Patent: Jun. 20, 2017

(54) METHOD FOR OFFERING SUGGESTION DURING CONVERSATION, ELECTRONIC DEVICE USING THE SAME, AND NON-TRANSITORY STORAGE MEDIUM

(71) Applicant: HTC Corporation, Taoyuan County (TW)

(72) Inventors: Yu-Cheng Lee, Taoyuan County (TW); Yuan-Mao Tsui, Taoyuan County (TW); Gabriel Jesse Webster, Taoyuan County (TW)

(73) Assignee: HTC Corporation, Taoyuan (TW)

(*) Notice: Subject to any disclaimer, the term of this patent is extended or adjusted under 35 U.S.C. 154(b) by 269 days.

(21) Appl. No.: 13/851,975

(22) Filed: Mar. 28, 2013

(65) Prior Publication Data

US 2013/0297317 A1 Nov. 7, 2013

Related U.S. Application Data

(60) Provisional application No. 61/625,052, filed on Apr. 16, 2012, provisional application No. 61/671,086, filed on Jul. 12, 2012.

(51) Int. Cl.
*G06Q 30/02* (2012.01)
*G10L 17/00* (2013.01)
*H04M 1/725* (2006.01)

(52) U.S. Cl.
CPC ....... *G10L 17/005* (2013.01); *H04M 1/72552* (2013.01)

(58) Field of Classification Search
CPC .............. G10L 15/30; G10L 2015/088; G10L 2015/225; G06Q 30/02; G06F 17/2785; G06F 17/279
(Continued)

(56) References Cited

U.S. PATENT DOCUMENTS 5,956,683 A * 9/1999 Jacobs et al. .............. 704/270.1
6,408,272 B1 * 6/2002 White et al. ............... 704/270.1
(Continued)

FOREIGN PATENT DOCUMENTS

CN 101251853 8/2008
CN 101611398 12/2009
(Continued)

OTHER PUBLICATIONS

"Office Action of Taiwan Counterpart Application", issued on Dec. 25, 2014, p.1-p.15.
(Continued)

*Primary Examiner* — Martin Lerner
(74) *Attorney, Agent, or Firm* — Jianq Chyun IP Office

(57) ABSTRACT

A method for offering suggestion during conversation, an electronic device using the same, and a non-transitory storage medium are provided. The method includes listening to a conversation on a first electronic device and a second electronic device, and determining whether the conversation satisfies a recommendation criterion. The method also includes determining whether at least one suggestion information exists in a database if the conversation satisfies the recommendation criterion. The method further includes displaying at least one suggestion option related to the at least one suggestion information on the first electronic device if the at least one suggestion information exists in the database.

11 Claims, 22 Drawing Sheets

(58) Field of Classification Search
USPC ............ 704/251, 270, 270.1, 275; 705/26.7; 715/705, 708
See application file for complete search history.

(56) References Cited

U.S. PATENT DOCUMENTS

| | | | |
|---|---|---|---|
| 6,721,416 B1* | 4/2004 | Farrell .................... | H04M 3/51 379/88.13 |
| 7,707,226 B1* | 4/2010 | Tonse ............................ | 707/796 |
| 8,037,147 B1 | 10/2011 | Herold et al. | |
| 8,375,309 B2* | 2/2013 | Fioretti .................. | G06Q 10/10 715/753 |
| 8,494,851 B2* | 7/2013 | DeLuca .................. | G10L 15/26 704/231 |
| 8,670,979 B2* | 3/2014 | Gruber ................ | G10L 15/1815 704/275 |
| 8,798,995 B1* | 8/2014 | Edara ............................ | 704/246 |
| 8,849,931 B2* | 9/2014 | Linner ................ | G06F 17/2765 707/755 |
| 8,856,664 B2* | 10/2014 | DeLuca ............... | G06Q 10/107 709/204 |
| 9,031,216 B1* | 5/2015 | Kamvar .................. | H04M 3/56 379/202.01 |
| 9,135,255 B2* | 9/2015 | Pavlidis ............ | G06F 17/30017 |
| 2006/0080321 A1* | 4/2006 | Horn ................ | G06F 17/30867 |
| 2006/0247932 A1* | 11/2006 | Yamamoto .................... | 704/270 |
| 2007/0099602 A1* | 5/2007 | Kurlander et al. ........... | 455/418 |
| 2008/0201434 A1* | 8/2008 | Holmes et al. ............... | 709/206 |
| 2009/0164914 A1 | 6/2009 | Chen | |
| 2012/0078713 A1* | 3/2012 | Smith .................... | G06Q 10/10 705/14.52 |
| 2012/0117015 A1* | 5/2012 | Sathish .......................... | 706/47 |
| 2013/0174034 A1* | 7/2013 | Brown .................... | G06F 3/048 715/708 |
| 2013/0273942 A1* | 10/2013 | Kaul et al. ................. | 455/456.3 |
| 2013/0275875 A1* | 10/2013 | Gruber .................... | G10L 15/22 715/728 |
| 2014/0245140 A1* | 8/2014 | Brown .................... | G06F 3/048 715/708 |
| 2014/0278403 A1* | 9/2014 | Jacob ........................ | G06F 3/01 704/235 |
| 2015/0195220 A1* | 7/2015 | Hawker ................. | H04L 51/02 707/769 |
| 2016/0093296 A1* | 3/2016 | Bangalore ........... | G10L 15/1822 704/239 |
| 2016/0217784 A1* | 7/2016 | Gelfenbeyn ............ | G10L 15/22 |

FOREIGN PATENT DOCUMENTS

| | | |
|---|---|---|
| CN | 102323933 | 1/2012 |
| TW | 200839551 | 10/2008 |
| TW | 200924459 | 6/2009 |

OTHER PUBLICATIONS

"Office Action of China Counterpart Application," issued on Dec. 8, 2015, p.1-p.9.

* cited by examiner

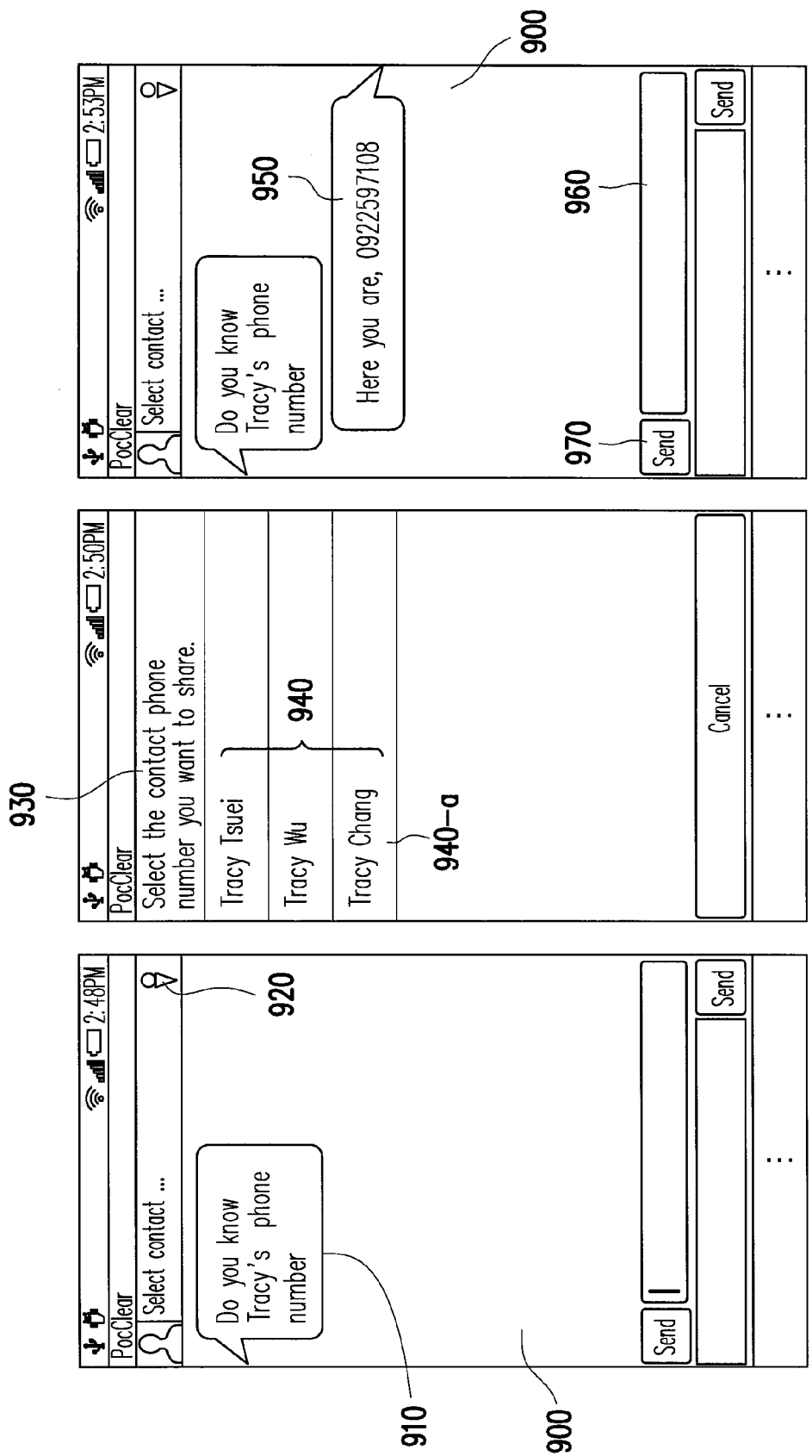

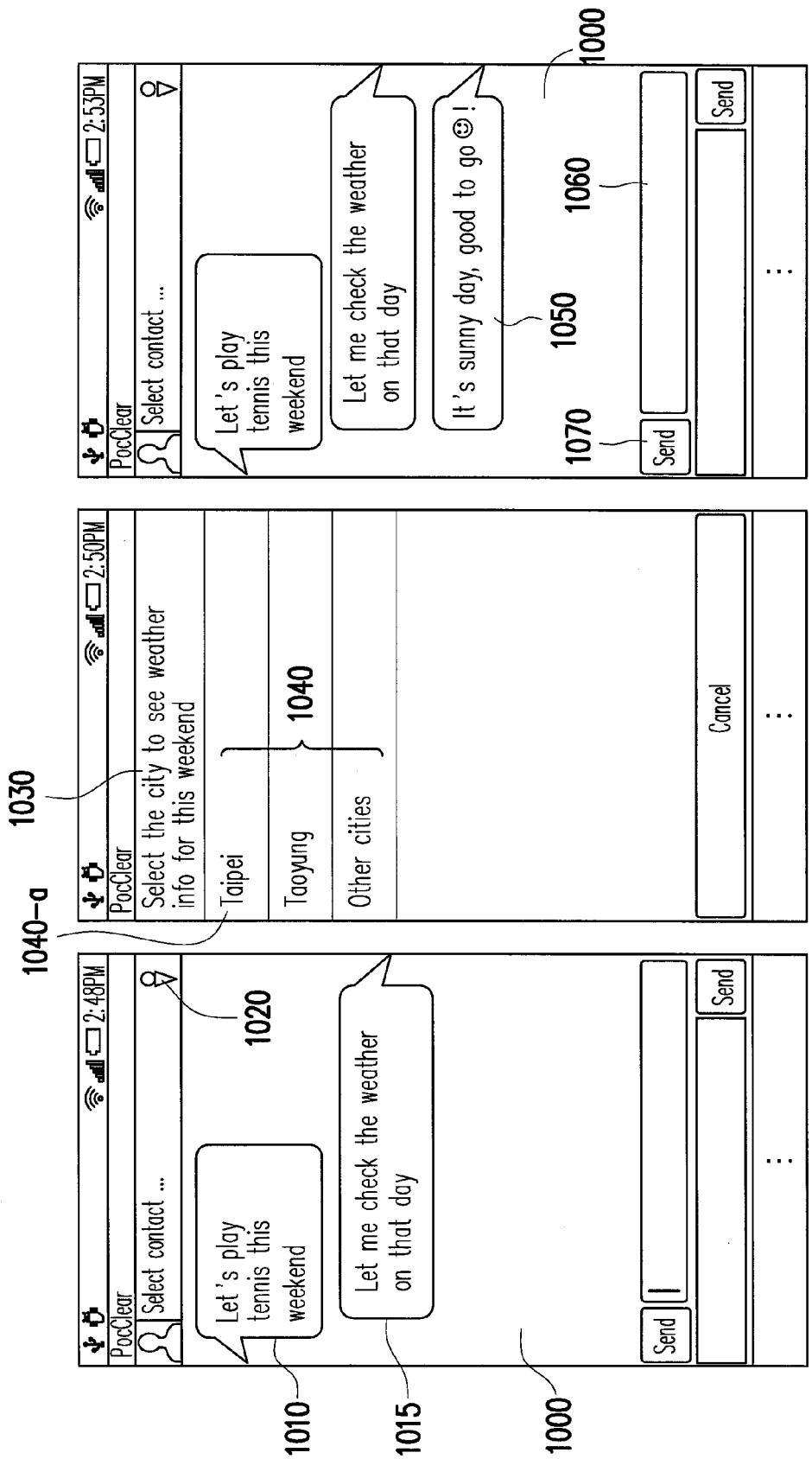

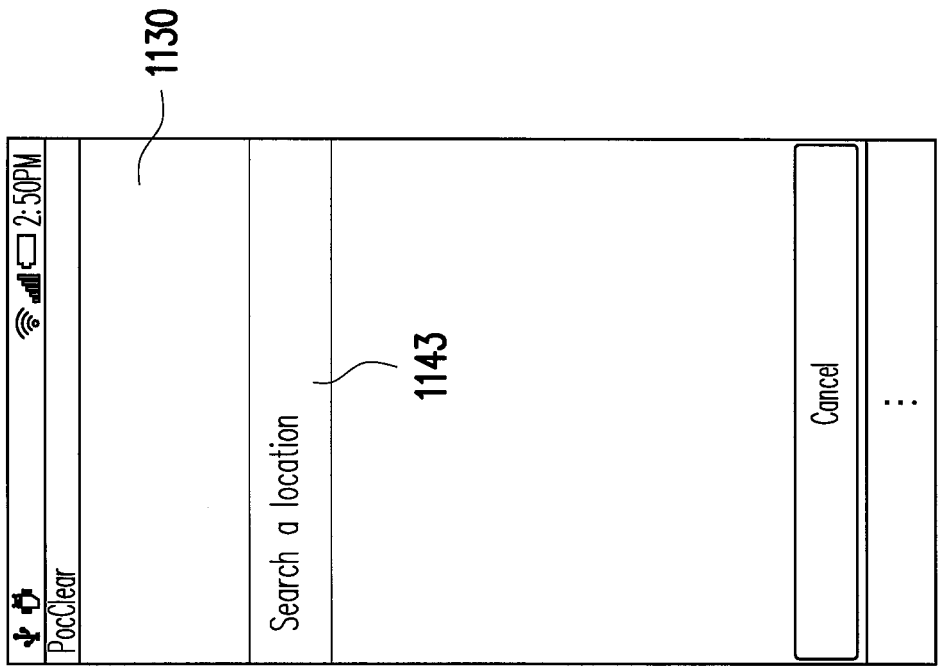
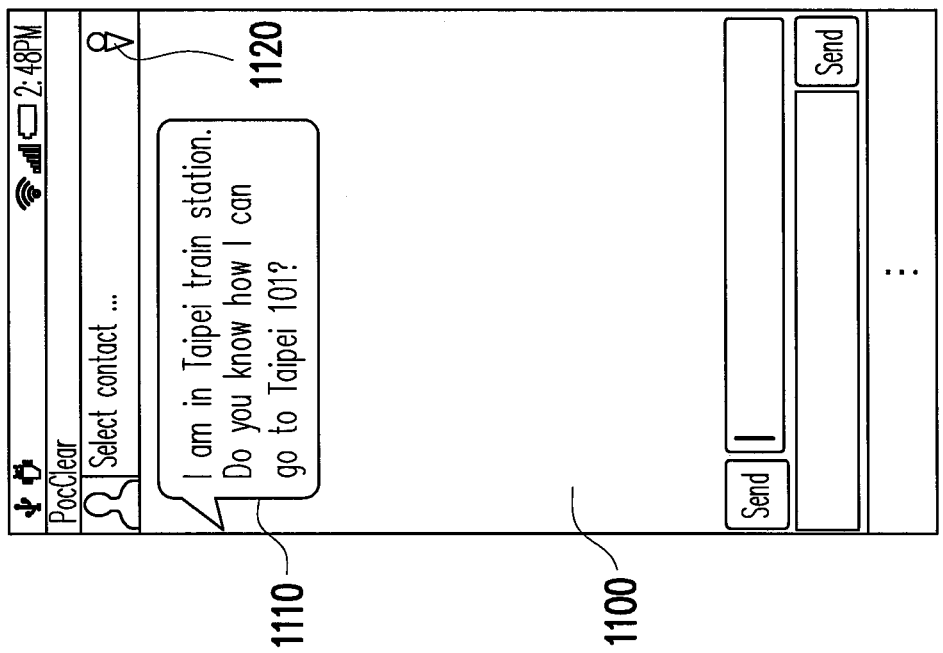
FIG. 11B
FIG. 11A

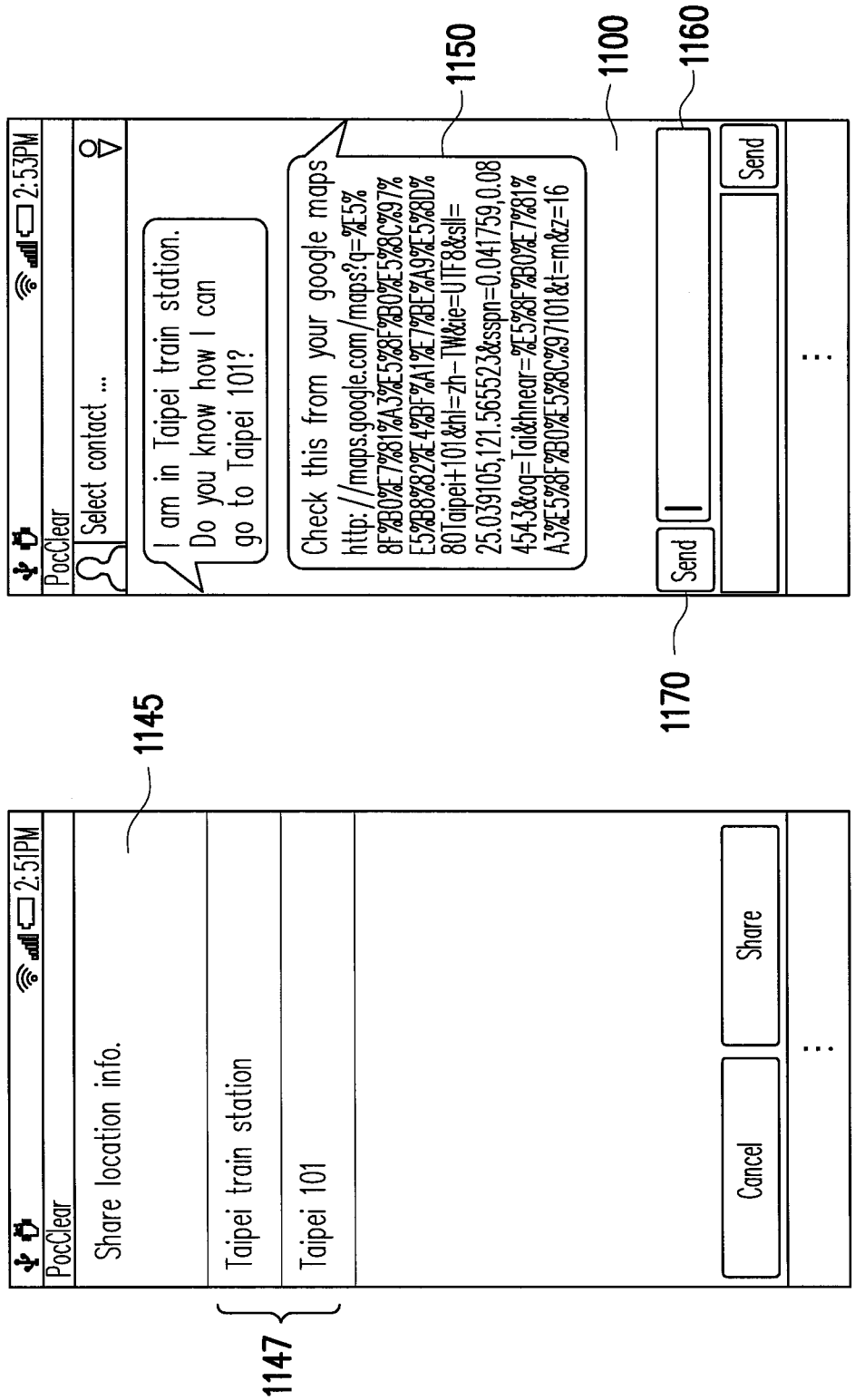

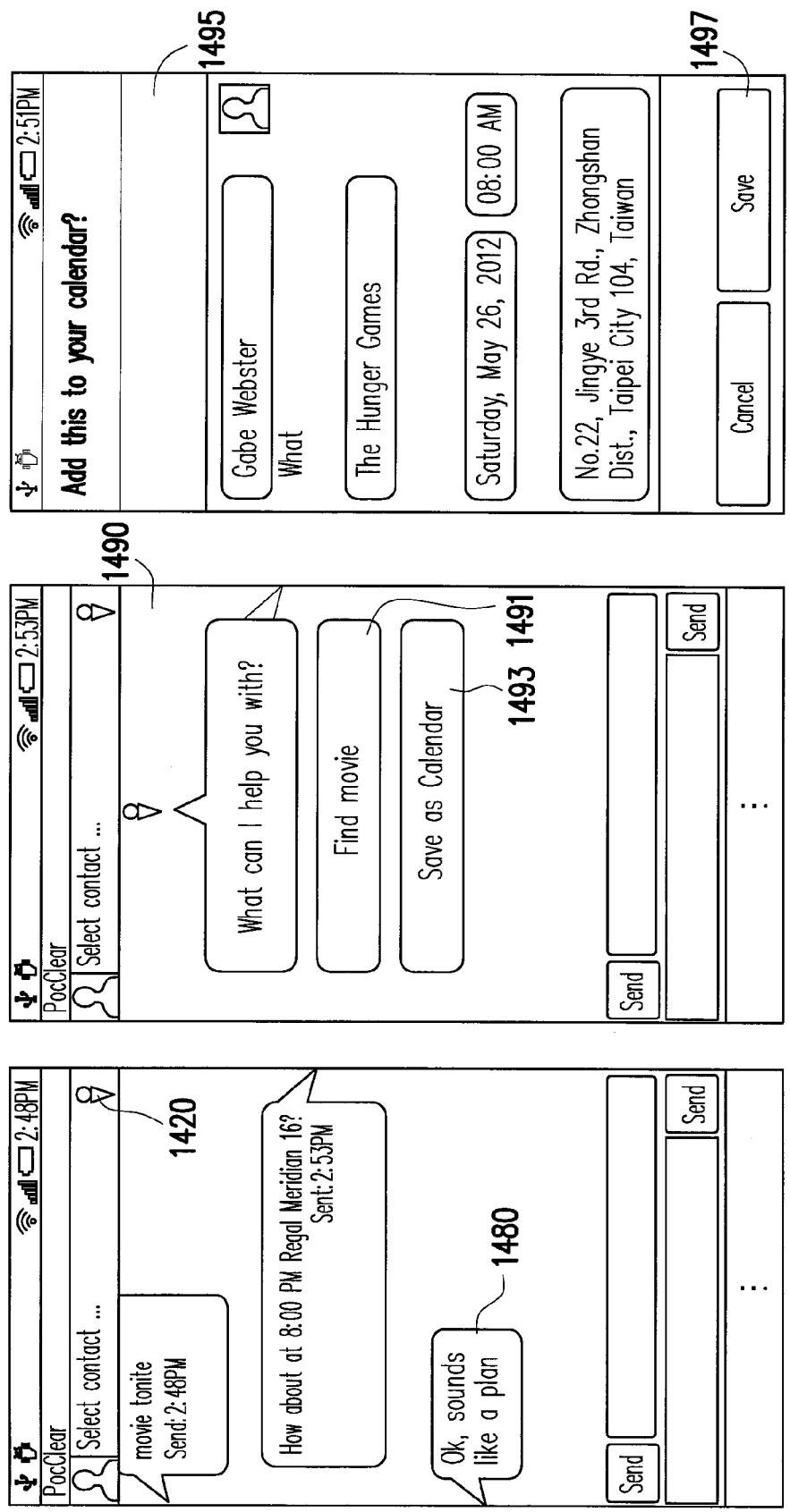

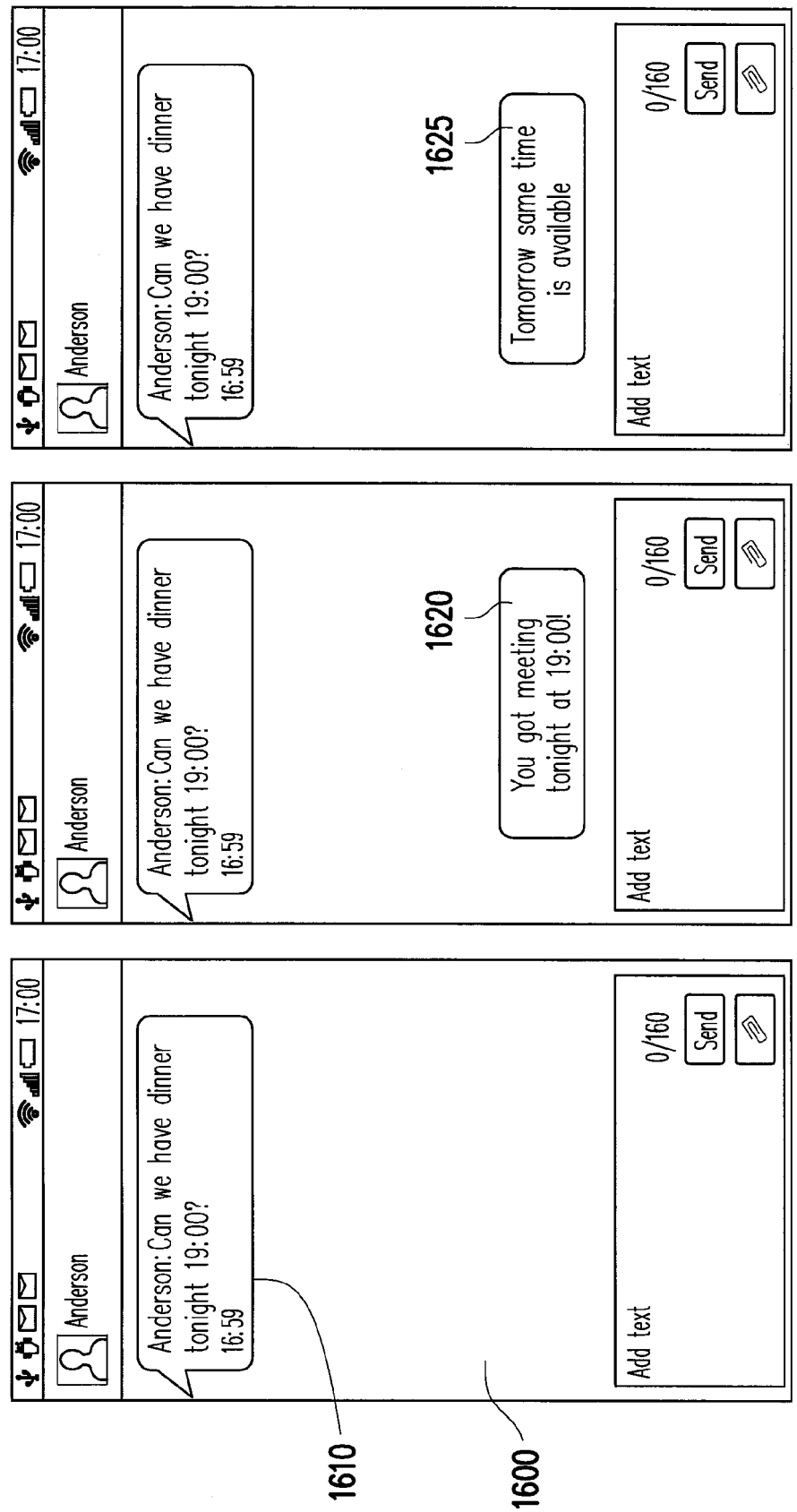

METHOD FOR OFFERING SUGGESTION DURING CONVERSATION, ELECTRONIC DEVICE USING THE SAME, AND NON-TRANSITORY STORAGE MEDIUM

CROSS-REFERENCE TO RELATED APPLICATION

This application claims the priority benefits of U.S. provisional application Ser. No. 61/625,052, filed on Apr. 16, 2012, and U.S. provisional application Ser. No. 61/671,086, filed on Jul. 12, 2012. The entirety of each of the above-mentioned patent applications is hereby incorporated by reference herein and made a part of specification.

BACKGROUND OF THE INVENTION

Field of the Invention

The present invention relates to a method of prompting suggestion. More particularly, the present invention relates to a method for offering suggestion during conversation between at least two users, an electronic device using the same, and a non-transitory storage medium.

Description of Related Art

To cope with modern busy lifestyle, mobile electronic devices equipped with numerous functions and occupying less space and easy to carry are developed. Take the smart phone as an example. The smart phone provides multiple functions and can be used as a mobile phone, a basic WORD processor, a wireless modem, etc., and provide wireless network access. In addition, the smart phone provides various services, which allow the user to access the Internet, receive and send E-mails, and upload data to cloud servers. Moreover, users may install various applications on the smart phone to expand the capabilities of the smart phone. For example, users may install the instant message application on the smart phone so as to have a text conversation with others.

However, while a first and a second user are having a conversation though the instant message application by using their smart phones, if the first user is about to ask the second user out for movie, the second user has to switch from the instant message application to a calendar application to check if he/she has available time for movie, and then switching back to the instant message application to continue the conversation. The foregoing operations are rather time-consuming and inconvenient.

SUMMARY OF THE INVENTION

Accordingly, the present invention is directed to method for offering suggestion during conversation, an electronic device using the same, and a non-transitory storage medium, by which an intelligent way to prompt suggestions during conversation between at least two users is provided.

The present invention is directed to a method for offering suggestion during conversation. The method includes listening to a conversation on a first electronic device and a second electronic device, and determining whether the conversation satisfies a recommendation criterion. The method also includes determining whether at least one suggestion information exists in a database if the conversation satisfies the recommendation criterion. The method further includes displaying at least one suggestion option related to the at least one suggestion information on the first electronic device if the at least one suggestion information exists in the database.

The present invention is directed to an electronic device having an input unit, a display unit, memory, one or more processors, and one or more programs. Here, the one or more programs are stored in the memory and configured to be executed by the one or more processors. The one or more programs include instructions to listen to a conversation on the electronic device and a second electronic device, to determine whether the conversation satisfies a recommendation criterion, to determine whether at least one suggestion information exists in a database if the conversation satisfies the recommendation criterion, and to display at least one suggestion option related to the at least one suggestion information on the display unit if the at least one suggestion information exists in the database.

The present invention is directed to a non-transitory storage medium, storing a computer program for loading into an electronic device, the computer program comprising commands to listen to a conversation on the electronic device and a second electronic device, to determine whether the conversation satisfies a recommendation criterion, to determine whether at least one suggestion information exists in a database if the conversation satisfies the recommendation criterion, and to display at least one suggestion option related to the at least one suggestion information on the electronic device if the at least one suggestion information exists in the database.

In the present invention, when two or more users are making conversation by using electronic devices, the suggestion information related to the conversation will be generated and displayed on the electronic device automatically, so as to assist the users to continue the conversation without leaving the conversational user interface for searching for the needed information.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 6A-6C, 7A-7C, 9A-9C, 10A-10C, 11A-11D, 13A-13F, 14A-14G, 16A-16F are schematic views illustrating the visual output while using the suggestion information during the conversation according to several embodiments of the invention.

DESCRIPTION OF EMBODIMENTS

Figure 1:
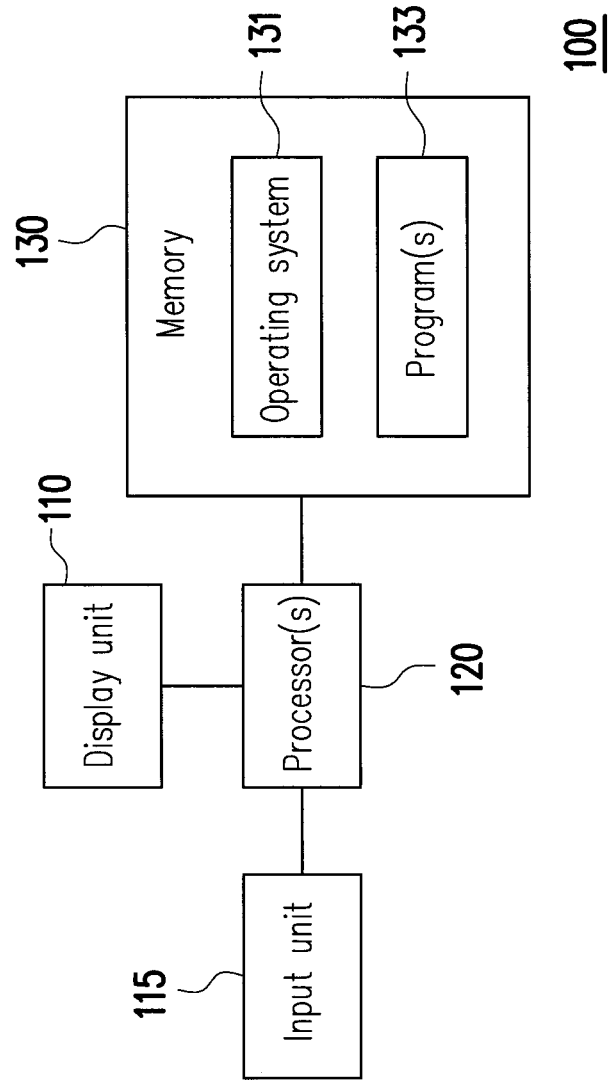
FIG. 1 is a block diagram of an electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In order to make the content of the present invention more clear, embodiments are described as follows to serve as the examples of which the present invention may be implemented accordingly.

FIG. 1 is a block diagram of an electronic device according to an embodiment of the present invention. Referring to FIG. 1, the electronic device 100 includes a display unit 110, an input unit 115, one or more processors 120, and a memory 130. The electronic device 100 is, for example, a mobile phone, a smart phone, a personal digital assistant (PDA), a laptop, or a tablet personal computer (PC), the present invention is not limited thereto.

The display unit 110 is used as an output interface of the electronic device 100. That is, the display unit 110 is configured to display different visual output when using the electronic device 100. The input unit 115 for receiving user operations may be a physical keyboard, a software input panel (SIP), or a combination thereof. In one embodiment, the display unit 110 and the input unit 115 are integrated into a touch screen. The touch screen may be a resistive touch screen, a capacitive touch screen, an optical touch screen, or a magnetic touch screen, which is not limited by the present invention.

The one or more processors 120 may be central processing units (CPUs), which are configured to run various software programs and/or instruction sets stored in the memory 130 to perform different functions of the electronic device 100, and to process data after the electronic device 100 is powered on.

The memory 130 may be an internal storage unit such as a random access memory or a non-volatile memory (e.g., a flash memory, or a magnetic disk storage device). The memory 130 may also be an external storage unit such as secure digital (SD) card, a SIM card, or other storage media which can be externally connected to the electronic device 100. In the present embodiment, at least an operating system 131 and one or more programs 133 are installed on the memory 130. However, the system data and/or the user data generated during the operation of the electronic device 100 may also stored in the memory 130.

The operating system 131 includes various software components and/or drivers and is used for managing a general operation of the electronic device 100. For example, the operating system 131 provides a user interface for users to interact with the electronic device 100, manages applications that are running on the electronic device 100, and manages files stored in the electronic device 100.

The one or more programs 133 comprise instructions to be executed by the one or more processors 120. To be specific, the one or more processors 120 run the one or more programs 133 to perform a method for offering suggestion during conversation of the present embodiment. The method for offering suggestion during conversation of the present embodiment is described later with reference of figures.

The electronic device 100 also includes a network module (not shown), which is configured to connect the electronic device 100 to a wireless or wired network. The wireless network is, for example, the wireless fidelity (WiFi) network, the global system for mobile communications (GSM) network, the code division multiple access (CDMA) network, the general packet radio service (GPRS) network, the $3^{rd}$-generation (3G) networks, the 4G network, or the worldwide interoperability for microwave access (WiMAX) network. The wired network may be the Internet or the local area network (LAN).

Figure 2:
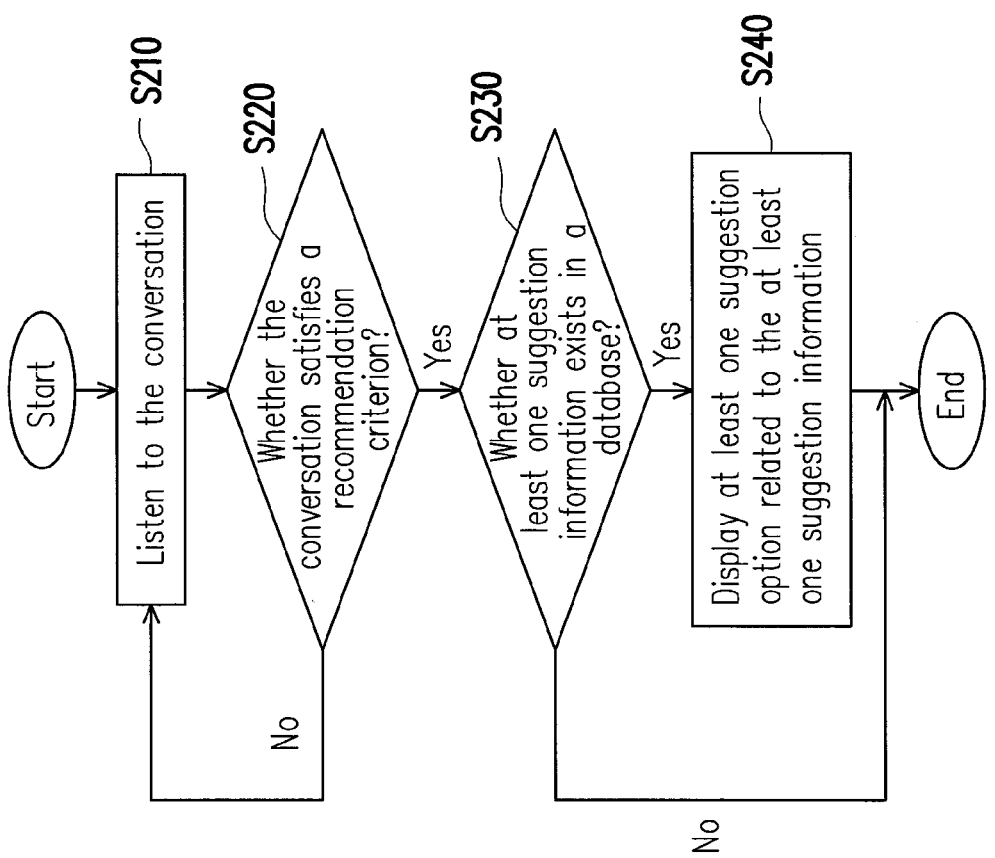
FIG. 2 is a flow chart of a method for offering suggestion during conversation according to an embodiment of the present invention.

Below, the operation of the electronic device 100 will be described in detail. FIG. 2 is a flow chart of a method for offering suggestion during conversation according to an embodiment of the present invention. Please refer to FIG. 1 and FIG. 2.

In the present embodiment, the user of the electronic device 100 is making a conversation with a second user using a second electronic device, wherein the features of the second electronic device may be the same as the electronic device 100 or different from the electronic device 100. To be specific, the conversation is established by the electronic device 100 and the second electronic device, and the conversation may be an instant messaging conversation, a short message service (SMS) conversation, a multimedia messaging service (MMS) conversation, an email conversation, or a voice conversation.

After the conversation on the electronic device 100 and the second electronic device is started, as shown in step S210, the electronic device 100 continuously listens to the conversation. In step S220, the electronic device 100 determines whether the conversation satisfies a recommendation criterion. The recommendation criterion means that the topic of the conversation shall include one or more keywords and the entire sentence structure follows the affirmative construction. Here, each keyword is about a property of an event, such as the type of the event, the name of the event, the participants of the event, the venue name of the event, the date and/or time of the event, and the address of the event, which is not limited by the present invention. To be specific, the electronic device 100 applies a keyword parsing process on the conversation to identify whether at least one keyword is in the conversation, wherein each of the at least one keyword is a name or an appellation of a person (corresponding to the participants of the event), a date and/or time (corresponding to the date and/or time of the event), an activity (corresponding to the type and/or the name of the event), or a place (corresponding to the venue name and/or the address of the event). If the at least one keyword is in the conversation, the electronic device 100 determines whether a sentence having the at least one keyword is a negative sentence, and determines that the conversation satisfies the recommendation criterion if the sentence is not the negative sentence. For example, assuming that a sentence in conversation is "I don't want to see a movie tonight". Even though, there is a keyword, movie, in the conversation, the electronic device 100 still determines that the conversation does not satisfy the recommendation criterion since the sentence is negative.

If the determination result of the step S220 is negative, the flow is returned to the step S210 to listen to the conversation continuously.

If the conversation satisfies the recommendation criterion (i.e., the determination result of the step S220 is positive), as shown in step S230, the electronic device 100 determines whether at least one suggestion information exists in a database.

Figure 3:
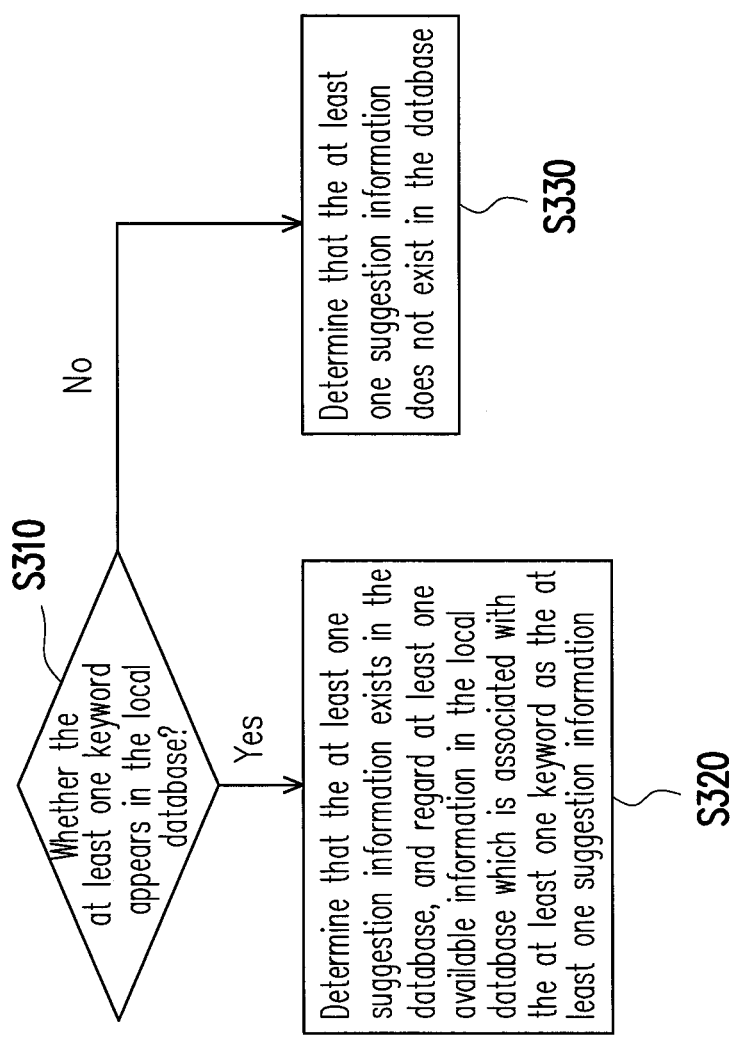
FIG. 3 is a flow chart of determining whether at least one suggestion information exists in a database according to an embodiment of the present invention.

FIG. 3 is a flow chart of determining whether at least one suggestion information exists in a database according to an embodiment of the present invention. In this embodiment, the database comprises a local database in the electronic device 100 and/or the second electronic device. For example, the local database may be stored in a non-volatile memory of the electronic device 100 and/or the second electronic device. In step S310, the electronic device 100 determines whether the at least one keyword appears in the local database. To be specific, if the local database is in the electronic device 100, then the electronic device 100 may directly access the information in the local database so as to search for the at least one keyword in the local database. However, if the local database is in the second electronic device, the electronic device 100 may send a search request to the second electronic device through the communication network, so as to search for the at least one keyword in the local database. If the determination result of the step S310 is positive, as shown in step S320, the electronic device 100 determines that the at least one suggestion information exists in the database, and regards at least one available information in the local database which is associated with the at least one keyword as the at least one suggestion information. However, if the determination result of the step S310 is negative, as shown in step S330, the electronic device 100 determines that the at least one suggestion information does not exist in the database.

Figure 4:
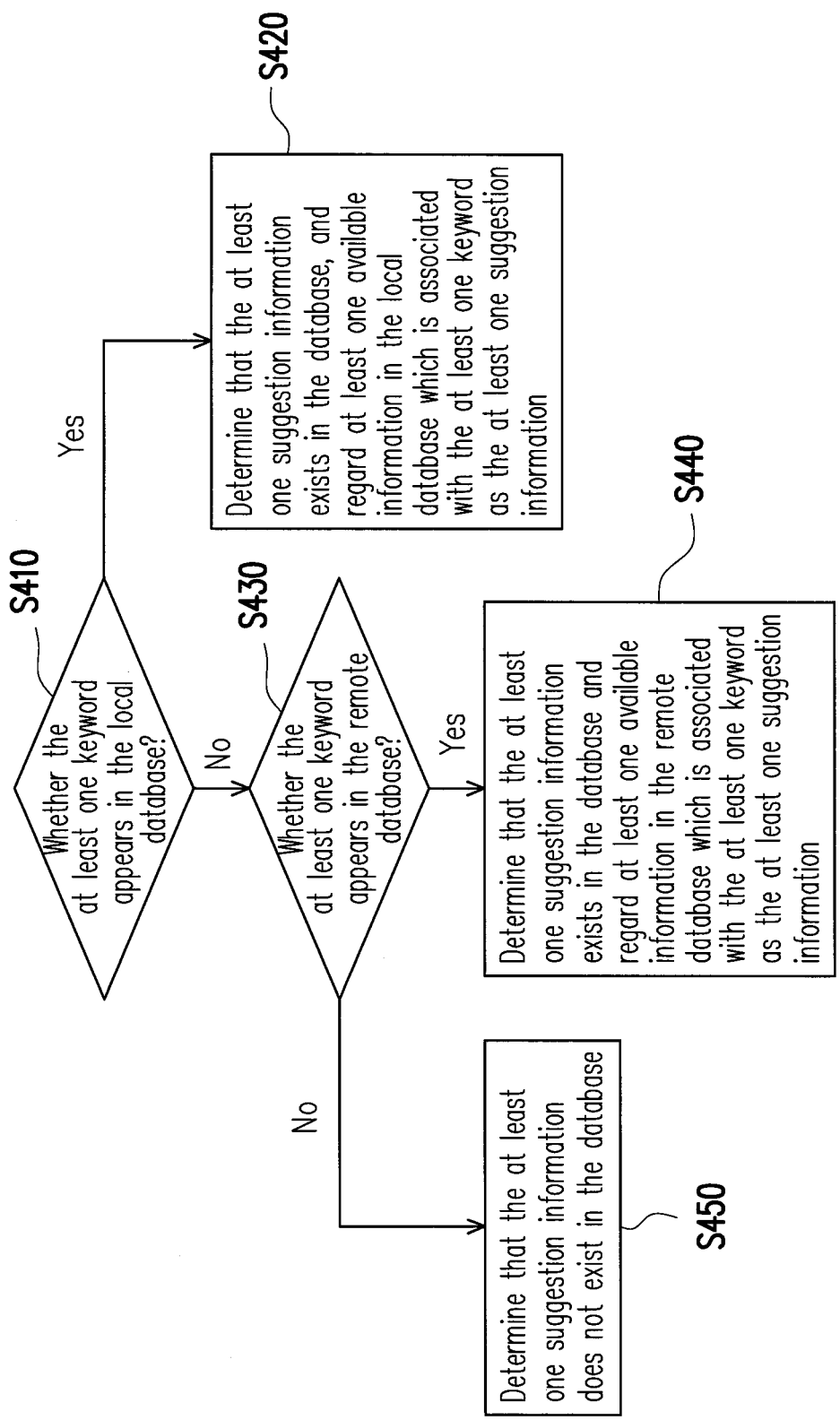
FIG. 4 is a flow chart of determining whether at least one suggestion information exists in a database according to another embodiment of the present invention.

FIG. 4 is a flow chart of determining whether at least one suggestion information exists in a database according to another embodiment of the present invention. In this embodiment, the database comprises a local database in the electronic device 100 and/or the second electronic device and a remote database. The remote database may be stored in a cloud storage or provided by any online service. Steps S410 and S420 in FIG. 4 are similar to the steps S310 and S320 in FIG. 3 and are not described herein. If the determination result of the step S410 is negative, as shown in S430, the electronic device 100 determines whether the at least one keyword appears in the remote database. The electronic device 100 may access the remote database through its network module. If the determination result of the step S430 is positive, in step S440, the electronic device 100 determines that the at least one suggestion information exists in the database and regards at least one available information in the remote database which is associated with the at least one keyword as the at least one suggestion information. If the determination result of the step S430 is negative, as shown in step S450, the electronic device 100 determines that the at least one suggestion information does not exist in the database.

Please referring to FIG. 2 again, if the determination result of the step S230 is negative (i.e., the electronic device 100 can not obtain any suggestion information from the database), the flow of the method is ended. However, if the determination result of the step S230 is positive, in step S240, the electronic device 100 displays at least one suggestion option related to the at least one suggestion information on the display unit 110. For example, the electronic device 100 may provide a specific icon with highlight effect on the display unit 110 to hint the user the suggestion about the conversation is available now. After detecting the user selection of the specific icon, the electronic device 100 displays the at least one suggestion option for the user to see and select the details or further options about the suggestion information. Alternatively, the user may tap the specific icon again at anytime if the conversation topic has not changed.

The following embodiments are used for illustrating the details of how the suggestion information can be used during the conversation between at least two users.

Figure 5:
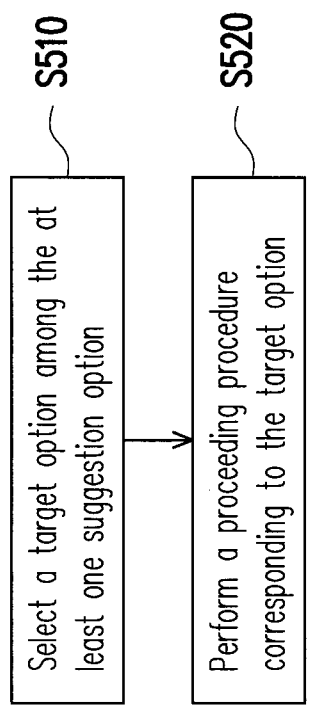
FIGS. 5, 8, 12, 15 are flow charts of using the suggestion information during the conversation according to several embodiments of the present invention.

FIG. 5 is a flow chart of using the suggestion information during the conversation according to an embodiment of the present invention. After the at least one suggestion option related to the at least one suggestion information is displayed on the display unit 110, in step S510, the electronic device 100 selects a target option among the at least one suggestion option in accordance with the operation of the user by using the input unit 115. Then, in step S520, the electronic device 100 performs a proceeding procedure corresponding to the target option, wherein the proceeding procedure may be one or the combination of launching a first application installed on the electronic device 100, linking to a web service through the electronic device 100, and storing at least one part of the at least one suggestion information related to the target option back to a second application installed on the electronic device 100. It should be noted that the first application, the second application, and the web service are related to the target option.

Figure 6:
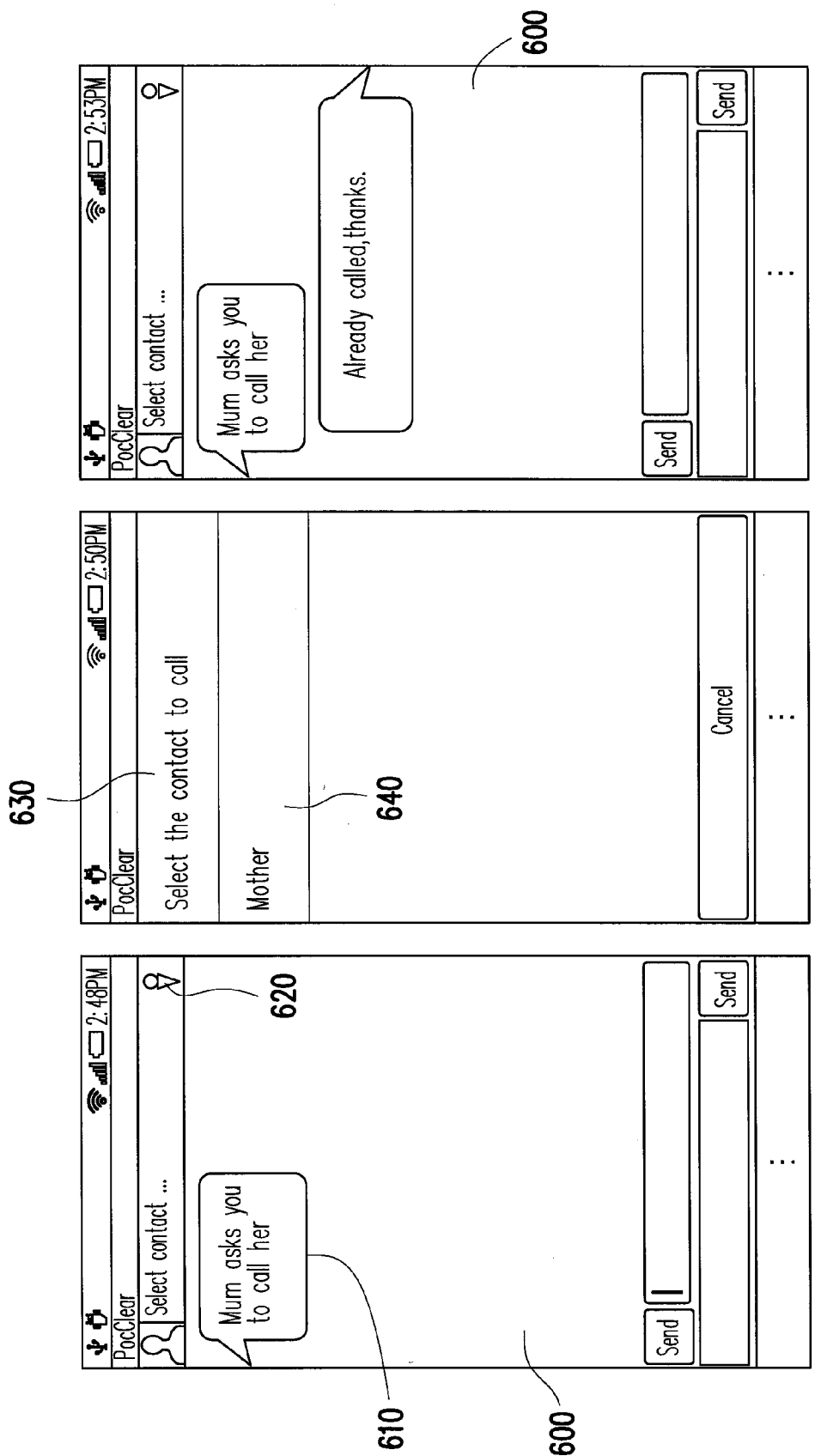

For example, assume that the user of the electronic device 100 and the user of the second electronic device are having a conversation by using a message application installed on both of the electronic device 100 and the second electronic device. As shown in a conversation user interface (UI) 600 in FIG. 6A, after the electronic device 100 receives a text message 610 from the second electronic device, the electronic device 100 extracts two keywords from the text message 610, wherein one of the keywords is a relative appellation (i.e., "Mom") and the other one is an activity (i.e., "call her"). According to the extracted keywords, the electronic device 100 attempts to obtain the suggestion information from a local database stored in the memory 130. It should be noted that the electronic device 100 selects one or more particular databases for searching the suggestion information of a certain type according to the keywords extracted from the conversation. That is, different keywords may lead the electronic device 100 to obtain different suggestion information from distinct databases. In this embodiment, the local database is the contact list stored within the electronic device 100, and the suggestion information may be the phone number of one or more contacts. Namely, the electronic device 100 may search for the phone number (or the other contact information) of a specific contact when mention of that contact is made in the conversation. A specific icon 620 is displayed on the conversation UI 600 if the electronic device 100 can obtain the phone number and/or the other contact information of a contact matching the relative appellation extracted form the text message 610 (i.e., the suggestion information). While the user taps the specific icon 620, the electronic device 100 displays a suggestion UI 630 as shown in FIG. 6B. A suggestion option 640 related to the obtained suggestion information is displayed on the suggestion UI 630. The user may tap the suggestion option 640 to directly make a phone call with the contact matching the relative appellation mentioned in the text message 610 instead of switching from the message application to a contact application to find the phone number in the contact list manually. Accordingly, a phone call application installed on the electronic device 100 is launched after the user taps the suggestion option 640. In one embodiment, as shown in FIG. 6C, once the phone call is over, the electronic device 100 displayed the conversation UI 600 again for the users to continue the conversation by using the message application.

In the foregoing embodiment, the electronic device 100 provides a suggestion option on the suggestion UI for the user to call (or send message) to the contact when his/her name has been mentioned in the conversation. The time of manually switching between different applications can be saved. Alternatively, if the contact list records more than one phone number of the contact corresponding to the relative appellation mentioned in the text message 610, the electronic device 100 provides an option list in the suggestion UI for the user to choose one phone number.

Figure 7:
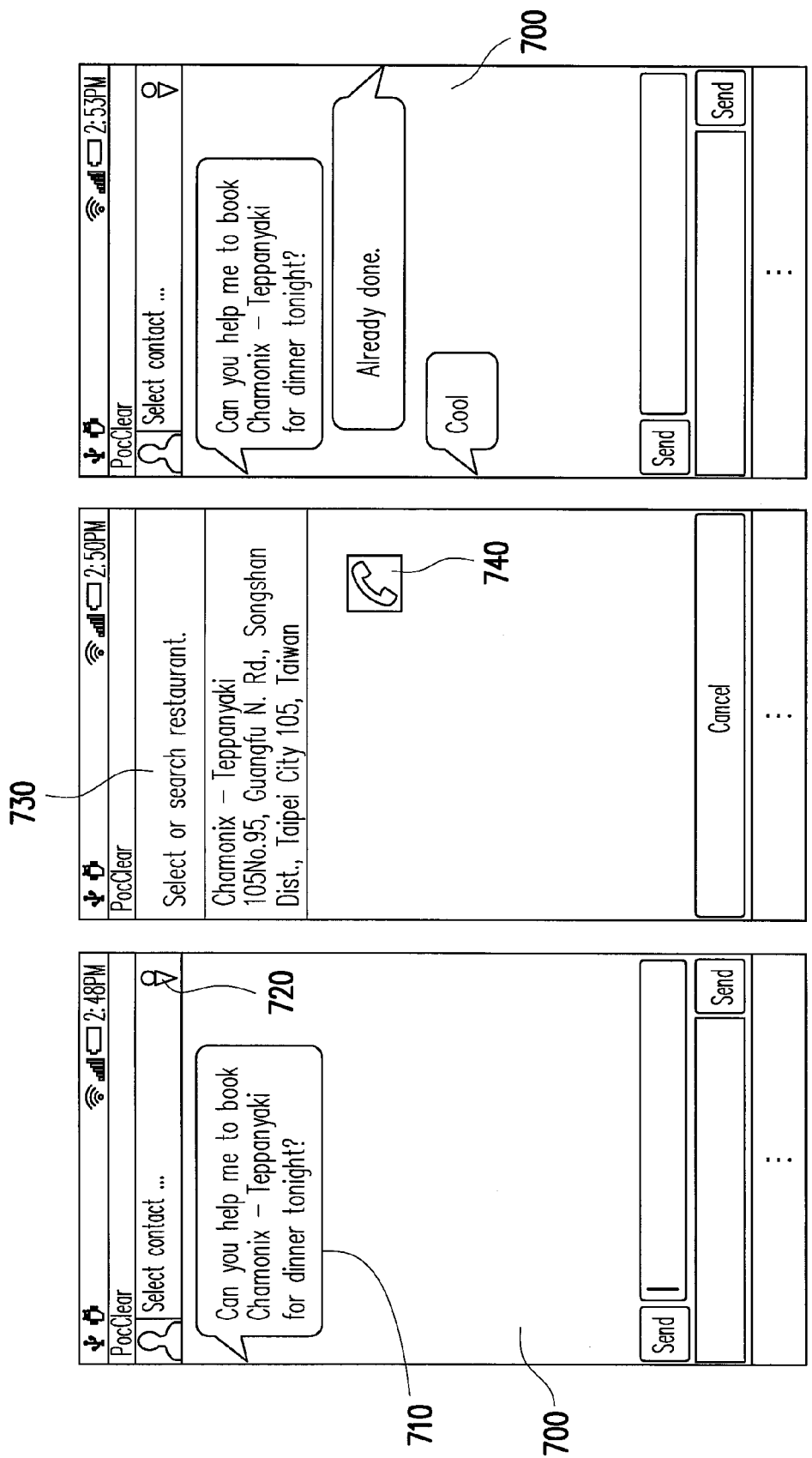

In another embodiment, as shown in a conversation UI 700 in FIG. 7A, after the electronic device 100 receives a text message 710 from the second electronic device, the electronic device 100 extracts three keywords from the text message 710. The keywords are an activity (i.e., "booking restaurant"), a place (i.e., the restaurant called "Chamonix-Teppanyaki"), and time (i.e., "tonight"). According to the extracted keywords, the electronic device 100 attempts to obtain the suggestion information from a local database stored in the memory 130 and/or a remote database. In this embodiment, the local database may be maintained by a calendar application installed on the electronic device 100, while the remote database may be maintained by web services (e.g., location-based restaurant recommendation services), and the suggestion information may be the phone number, the location, and the opening hours of the restaurant mentioned in the text message 710. A specific icon 720 is displayed on the conversation UI 700 after the electronic device 100 obtains the suggestion information. While the user taps the specific icon 720, the electronic device 100 displays a suggestion UI 730 as shown in FIG. 7B. A suggestion option 740 related to the obtained suggestion information is displayed on the suggestion UI 730. Without searching for the phone number of the restaurant manually, the user may tap the suggestion option 740 to directly make a phone call with the restaurant. In this embodiment, as shown in FIG. 7C, once the phone call is over, the electronic device 100 displays the conversation UI 700 again for the users to continue the conversation by using the message application.

In FIG. 7A to FIG. 7C, the electronic device 100 provides restaurant information such as the phone number, the location, and the opening hours when users mentioned the restaurant in the conversation. Accordingly, the user can get the restaurant information without searching manually.

Figure 8:
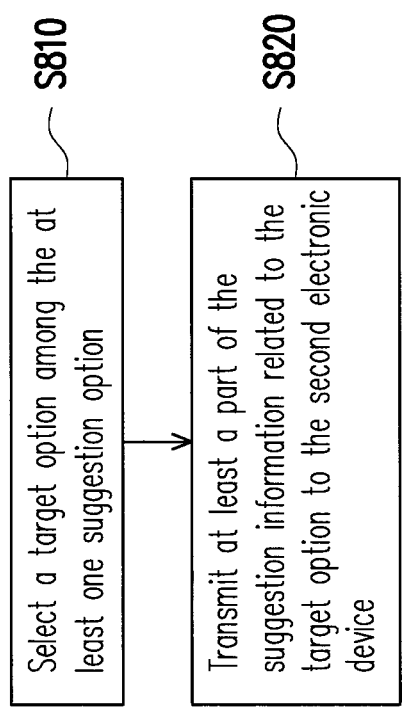

FIG. 8 is a flow chart of using the suggestion information during the conversation according to an embodiment of the present invention. After the at least one suggestion option related to the at least one suggestion information is displayed on the display unit 110, in step S810, the electronic device 100 selects a target option among the at least one suggestion option in accordance with the operation of the user by using the input unit 115. After that, in step S820, the electronic device 100 transmits at least one part of the suggestion information related to the target option to the second electronic device. To be specific, the suggestion information related to the target option is regarded as the target information, and at least a part of the target information will be transmitted to the second electronic device.

FIGS. 9A-9C are schematic views illustrating the visual output while using the suggestion information during the conversation according to an embodiment of the invention. As shown in a conversation UI 900 in FIG. 9A, after the electronic device 100 receives a text message 910 from the second electronic device, the electronic device 100 extracts a keyword from the text message 910, wherein the keyword is a name of a person (i.e., "Tracy"). According to the extracted keyword, the electronic device 100 attempts to obtain the suggestion information from a local database stored in the memory 130. In this embodiment, the local database is the contact list stored within the electronic device 100, and the suggestion information is the phone number of one or more contacts matching the extracted keyword "Tracy". A specific icon 920 is displayed on the conversation UI 900 after the electronic device 100 obtains the suggestion information. While the user taps the specific icon 920, the electronic device 100 displays a suggestion UI 930 as shown in FIG. 9B. Assuming that there are three contacts named "Tracy" in the contact list, as shown in the suggestion UI 930, three suggestion options 940 related to the obtained suggestion information are displayed for user selection. After the user selects one of the suggestion options 940 (e.g., the suggestion option 940-a), the phone number of the contact related to the suggestion option 940-a is transmitted to the second electronic device as shown in FIG. 9C. To be specific, the phone number of the contact related to the suggestion option 940-a may be displayed in the input field 960, and the user of the electronic device 100 may also enter text in the input field 960. After the user selects the send icon 970, the text message 950 is generated and transmitted to the second electronic device.

FIGS. 10A-10C are schematic views illustrating the visual output while using the suggestion information during the conversation according to an embodiment of the invention. As shown in a conversation UI 1000 in FIG. 10A, after the electronic device 100 receives a text message 1010 from the second electronic device and a text message 1015 entered by the user of the electronic device 100, the electronic device 100 extracts a keyword from the text message 1015, wherein the keyword is an activity such as "check the weather". According to the extracted keyword, the electronic device 100 attempts to obtain the suggestion information from a remote database through the network. In this embodiment, the remote database may be maintained by a weather forecast website, and the suggestion information may be the weather information. A specific icon 1020 is displayed on the conversation UI 1000 after the electronic device 100 obtains the suggestion information. While the user taps the specific icon 1020, the electronic device 100 displays a suggestion UI 1030 as shown in FIG. 10B. On the suggestion UI 1030, three suggestion options 1040 related to different locations are displayed for user selection. After the user selects one of the suggestion options 1040 (e.g., the suggestion option 1040-a), the weather information of the location related to the suggestion option 1040-a is transmitted to the second electronic device as shown in FIG. 10C. To be specific, a partial or complete weather information of the location related to the suggestion option 1040-a may be displayed in the input field 1060, and the user of the electronic device 100 may also enter text in the input field 1060. After the user selects the send icon 1070, the text message 1050 is generated and transmitted to the second electronic device.

In this embodiment, the electronic device 100 provides the weather information for users to query with further location information selection when users mention weather question on conversation.

FIGS. 11A-11D are schematic views illustrating the visual output while using the suggestion information during the conversation according to an embodiment of the invention. In this embodiment, the electronic device 100 provides location search option when users mention about query a specific place. As shown in a conversation UI 1100 in FIG. 11A, after the electronic device 100 receives a text message 1110 from the second electronic device, the electronic device 100 extracts two keywords from the text message 1110, wherein the keywords are two places such as "Taipei train station" and "Taipei 101". According to the extracted keywords, the electronic device 100 attempts to obtain the suggestion information from a remote database through the network. In this embodiment, the remote database may be maintained by a map website, and the suggestion information may be the location information. A specific icon 1120 is displayed on the conversation UI 1100 after the electronic device 100 obtains the suggestion information. While the user taps the specific icon 1120, the electronic device 100 displays a suggestion UI 1130 as shown in FIG. 11B. In the suggestion UI 1130, a suggestion option 1143 is displayed for the user to search a location information of a place mentioned in the text message 1110. After the user selects the suggestion option 1143, as shown in FIG. 11C, two suggestion options 1147 related to the location information of "Taipei train station" and "Taipei 101" are displayed on the suggestion UI 1145, and once the user selects one of the suggestion options 1147, the location information related to the option selected by the user is transmitted to the second electronic device as shown in FIG. 11D. In this embodiment, the location information is in a web page and the hyperlink of that web page will be transmitted to the second electronic device as shown in the text message 1150. To be specific, the hyperlink may be displayed in the input field 1160, and the user of the electronic device 100 may also enter text in the input field 1160. After the user selects the send icon 1170, the text message 1150 is generated and transmitted to the second electronic device. The user of the second electronic device may click the hyperlink to obtain the location information.

Figure 12:
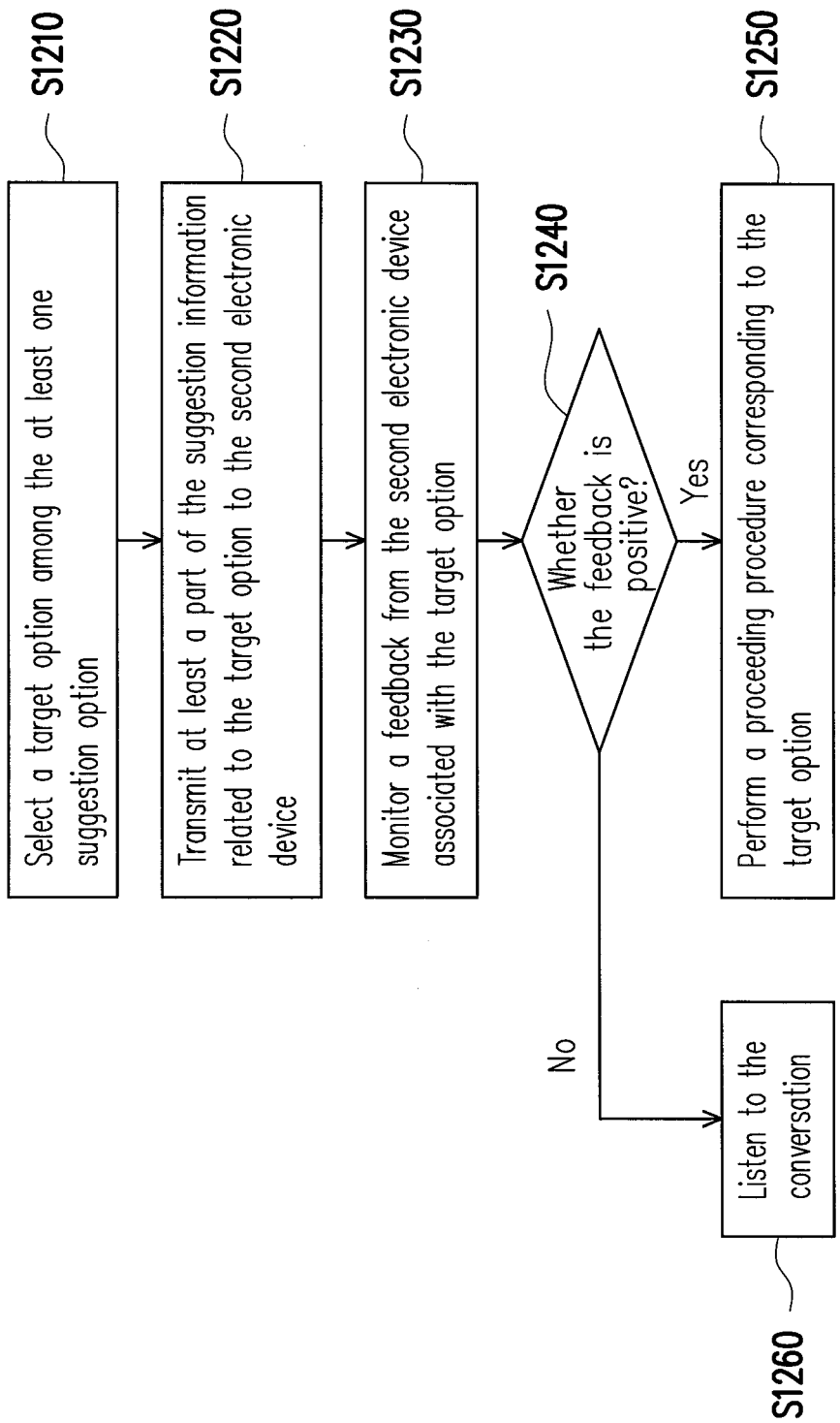

FIG. 12 is a flow chart of using the suggestion information during the conversation according to an embodiment of the present invention. After the at least one suggestion option related to the at least one suggestion information is displayed on the display unit 110 of the electronic device 100, in step S1210, the electronic device 100 selects a target option among the at least one suggestion option in accordance with the operation of the user by using the input unit 115. Then, in step S1220, the electronic device 100 transmits at least one part of the suggestion information related to the target option to the second electronic device. To be specific, the suggestion information related to the target option is regarded as the target information, and partial or complete target information will be transmitted to the second electronic device.

In step S1230, the electronic device 100 monitors a feedback from the second electronic device associated with the target option. When the electronic device 100 receives the feedback from the second electronic device, in step S1240, the electronic device 100 determines whether the feedback is positive. If the determination result of the step S1240 is negative, in step S1260, the electronic device 100 listens to the conversation continuously.

However, if the determination result of the step S1240 is positive, in step S1250, the electronic device 100 performs a proceeding procedure corresponding to the target information. In this embodiment, the proceeding procedure is one or the combination of launching a first application installed on the electronic device 100, linking to a web service through the electronic device 100, and storing the suggestion information transmitted to the second electronic device back to a second application installed on the electronic device 100. Here, the first application, the second application, and the web service are related to the target option.

FIGS. 13A-13F are schematic views illustrating the visual output while using the suggestion information during the conversation according to an embodiment of the invention. As shown in a conversation UI 1300 in FIG. 13A, after the electronic device 100 receives a text message 1310 from the second electronic device, the electronic device 100 extracts two keywords from the text message 1310, wherein the keywords are an activity (i.e., "dinner") and time (i.e., "tonight"). It should be noted that the electronic device 100 has the fault tolerance ability of keyword extraction. Accordingly, although the user of the second electronic device enters the word "tonite", the electronic device 100 is able to obtain the word "tonight" as the keyword.

Figure 13B:
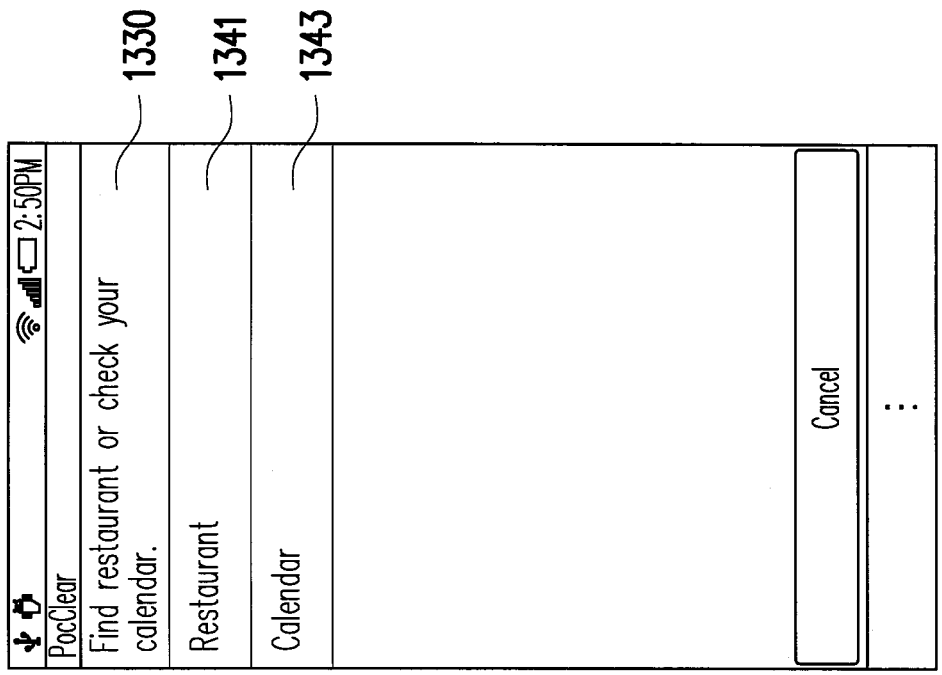
Figure 13A:
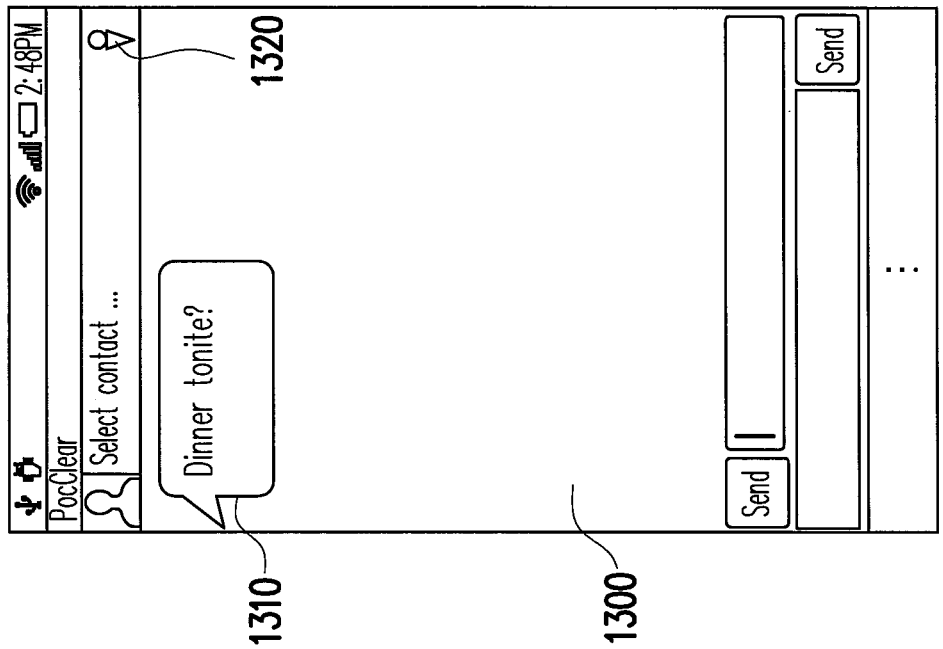
Figures 13C, 13D:
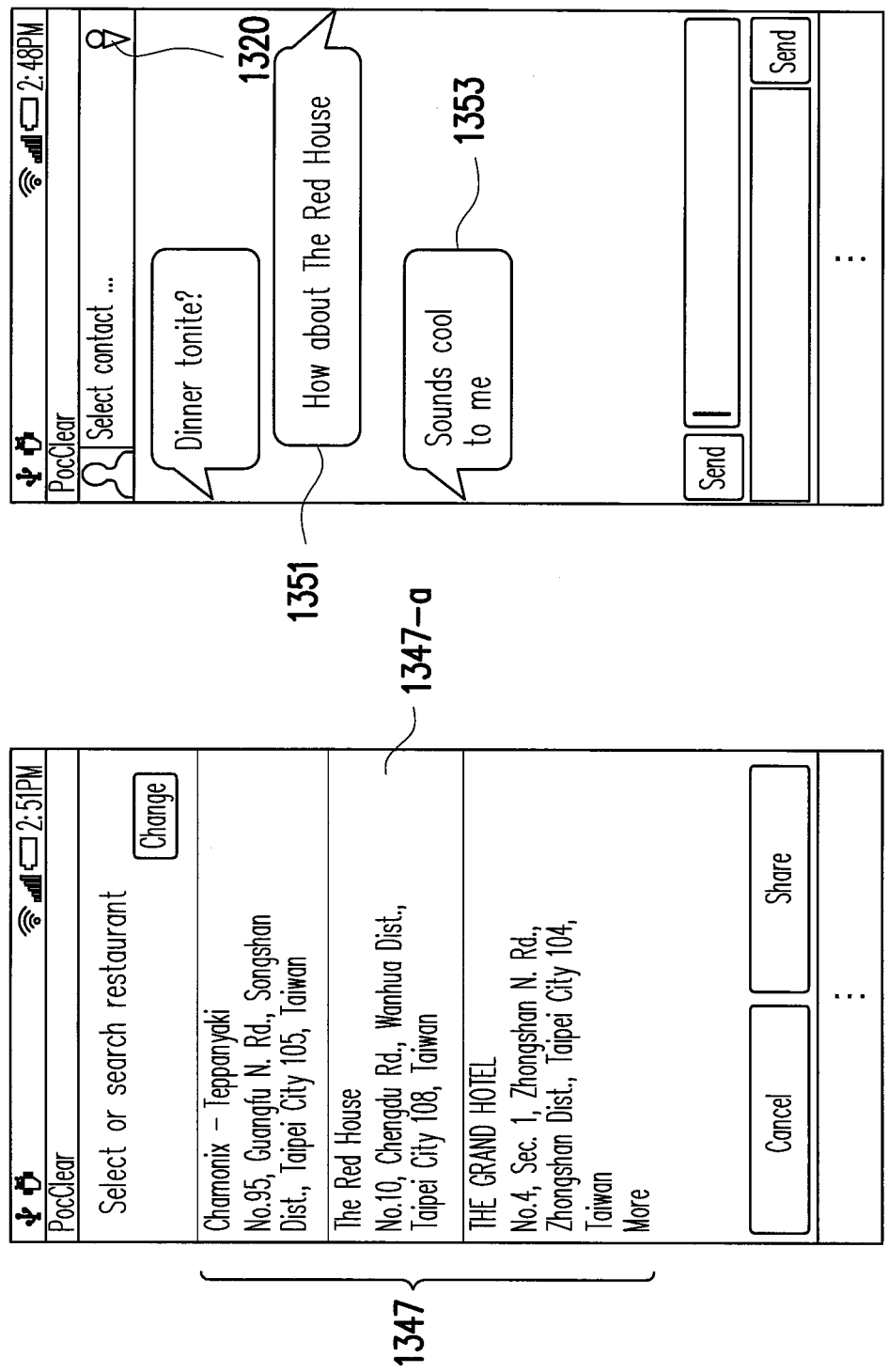
Figures 13E, 13F:
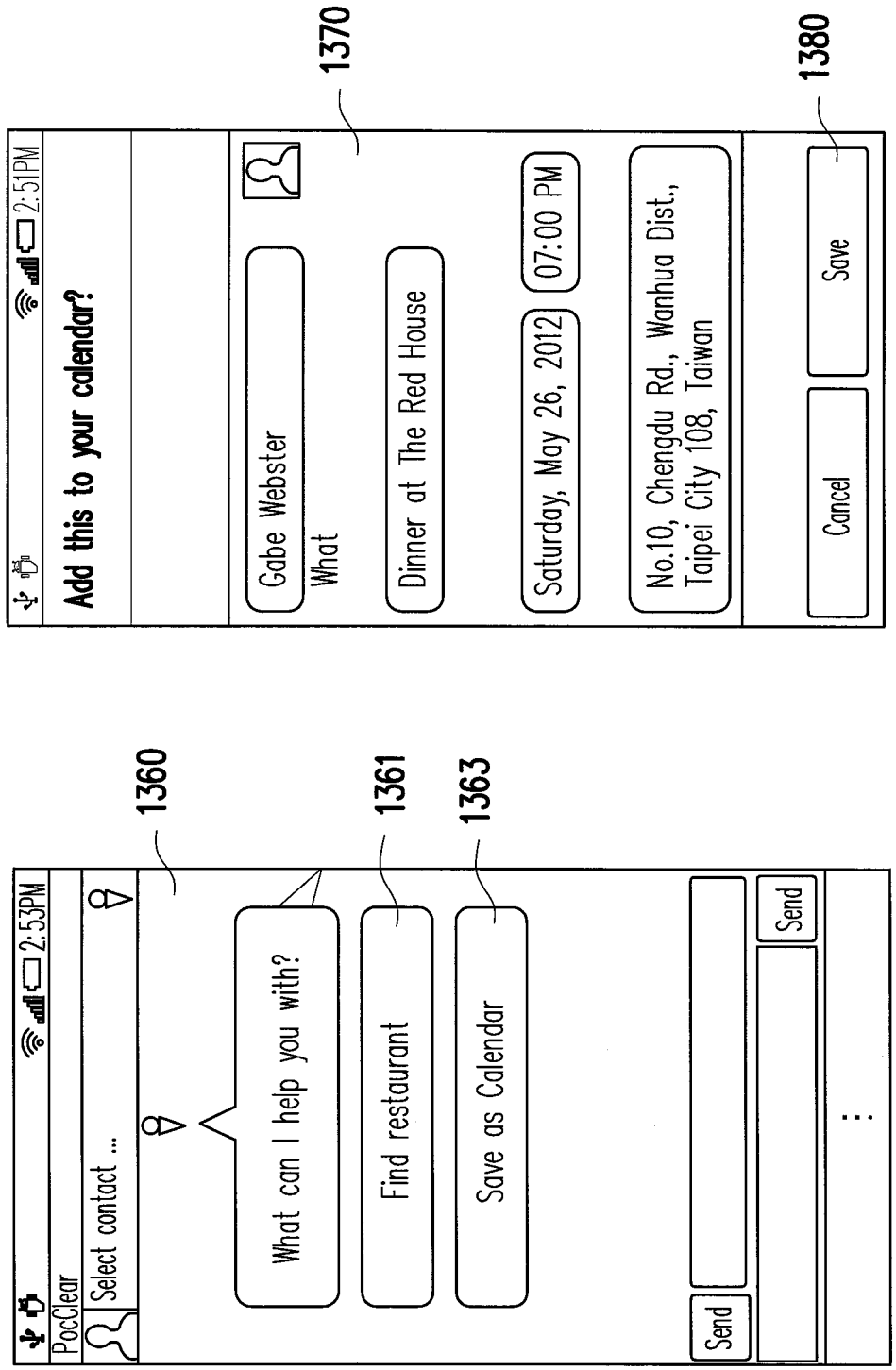

According to the extracted keywords, the electronic device 100 attempts to obtain the suggestion information from a remote database through the network and a local database stored in the memory 130. In this embodiment, the remote database may be maintained by one or more websites, the local database may be provided by the calendar application installed on the electronic device 100, and the suggestion information may be the restaurant information and/or the available time of the user of the electronic device 100. A specific icon 1320 is displayed on the conversation UI 1300 after the electronic device 100 obtains the suggestion information. While the user taps the specific icon 1320, the electronic device 100 displays a suggestion UI 1330 as shown in FIG. 13B. On the suggestion UI 1330, the suggestion options 1341 and 1343 are displayed for user selection. If the user taps the suggestion option 1343, the electronic device 100 checks the available time of the user according to the database maintained by the calendar application installed therein. If the user taps the suggestion option 1341, as shown in FIG. 13C, three suggestion options 1347 corresponding to information on three restaurants are displayed. While the user taps one of the suggestion options 1347 (e.g., the suggestion options 1347-a), as shown in FIG. 13D, the name of the restaurant related to the suggestion options 1347-a is transmitted to the second electronic device (as shown in the text message 1351). In another embodiment, the address of the restaurant related to the suggestion options 1347-a is transmitted to the second electronic device as well. After that, when the electronic device 100 receives a feedback (i.e., the text message 1353) from the second electronic device, the electronic device 100 determines whether the feedback is positive. In this embodiment, since the feedback is positive, the electronic device 100 displays a suggestion UI 1360 as shown in FIG. 13E after the user taps the specific icon 1320. The electronic device 100 provides a suggestion option 1361 for the user to find other restaurant information, and provides a suggestion option 1363 for the user to save the gathering information back to the calendar application installed on the electronic device 100. In this embodiment, assuming that the user taps the suggestion option 1363, as shown in FIG. 13F, the electronic device 100 launches the calendar application and displays a new event UI 1370, wherein the name and the location information of the restaurant and the day and time information are displayed in the new event UI 1370. The user only has to tap the option 1380 to save the event to the calendar application.

In the foregoing embodiment, the electronic device 100 provides the restaurant information such as the location information when users mentioned a certain restaurant on conversation, and saves the gathering information into the calendar application installed therein. In another embodiment, the electronic device 100 may help the user to book the restaurant by showing the phone number and/or the web page of the restaurant.

FIGS. 14A-14G are schematic views illustrating the visual output while using the suggestion information during the conversation according to an embodiment of the invention. As shown in a conversation UI 1400 in FIG. 14A, after the electronic device 100 receives a text message 1410 from the second electronic device, the electronic device 100 extracts two keywords from the text message 1410, wherein the keywords are an activity (i.e., "movie") and time (i.e., "tonight"). It should be noted that, although the user of the second electronic device enters the word "tonite", the electronic device 100 is able to obtain the word "tonight" as a keyword because of the fault tolerance ability of keyword extraction.

According to the extracted keywords, the electronic device 100 attempts to obtain the suggestion information from a remote database through the network and a local database stored in the memory 130. In this embodiment, the remote database may be maintained by one or more websites, the local database may be provided by the calendar application installed on the electronic device 100, and the suggestion information may be the movie information (such as the movie title information, the theater information, and the show time information) and/or the available time of the user of the electronic device 100. A specific icon 1420 is displayed on the conversation UI 1400 after the electronic device 100 obtains the suggestion information.

Figure 14B:
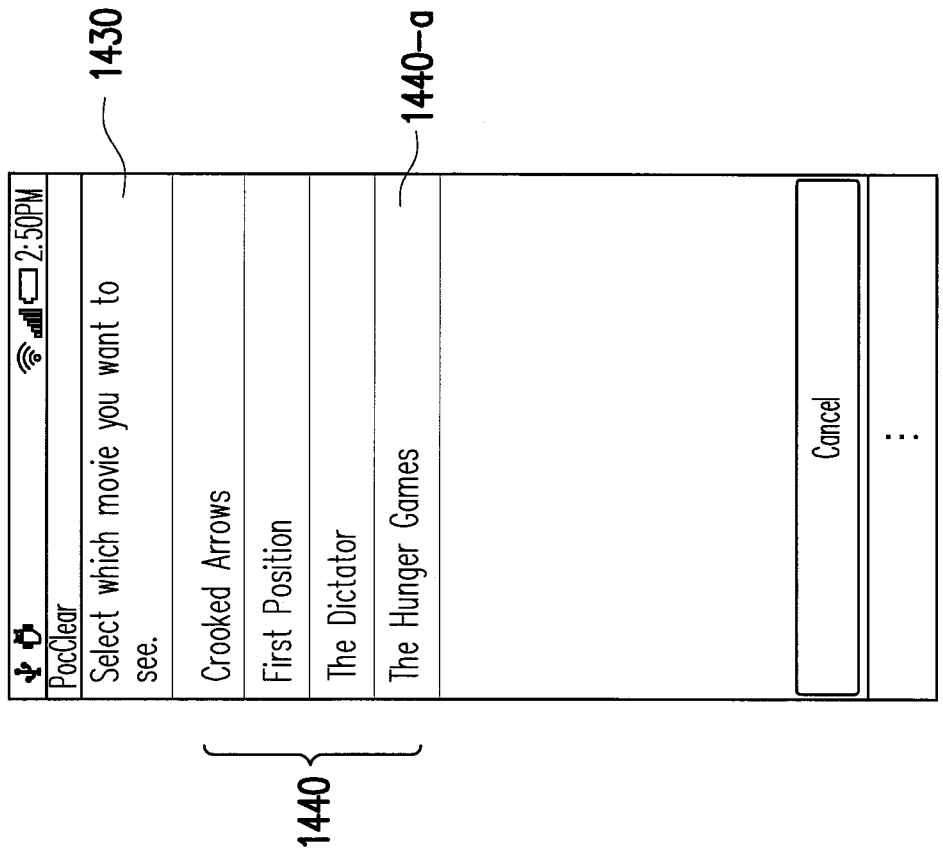
Figure 14A:
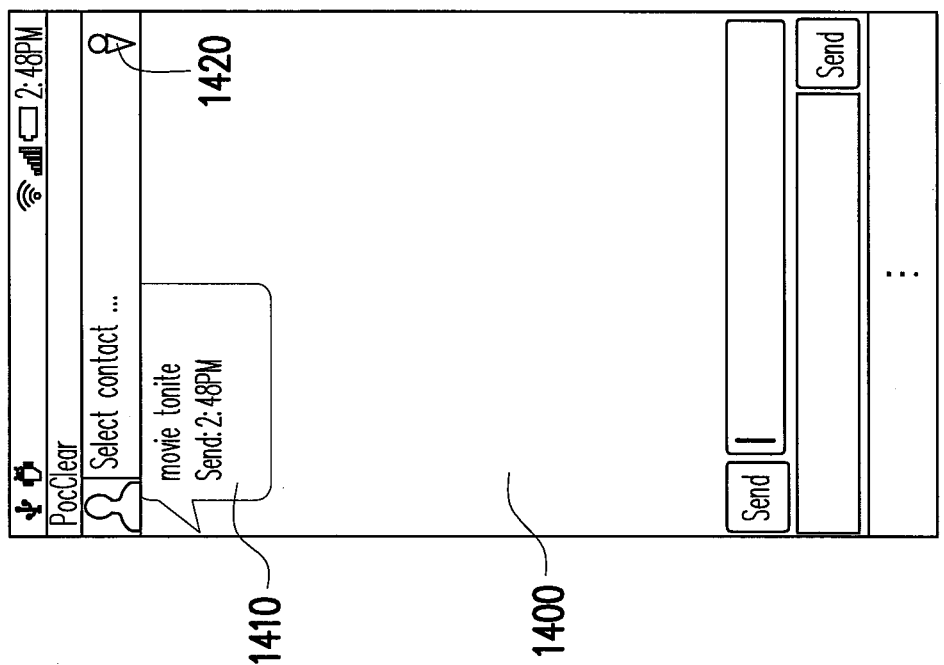
Figures 14C, 14D:
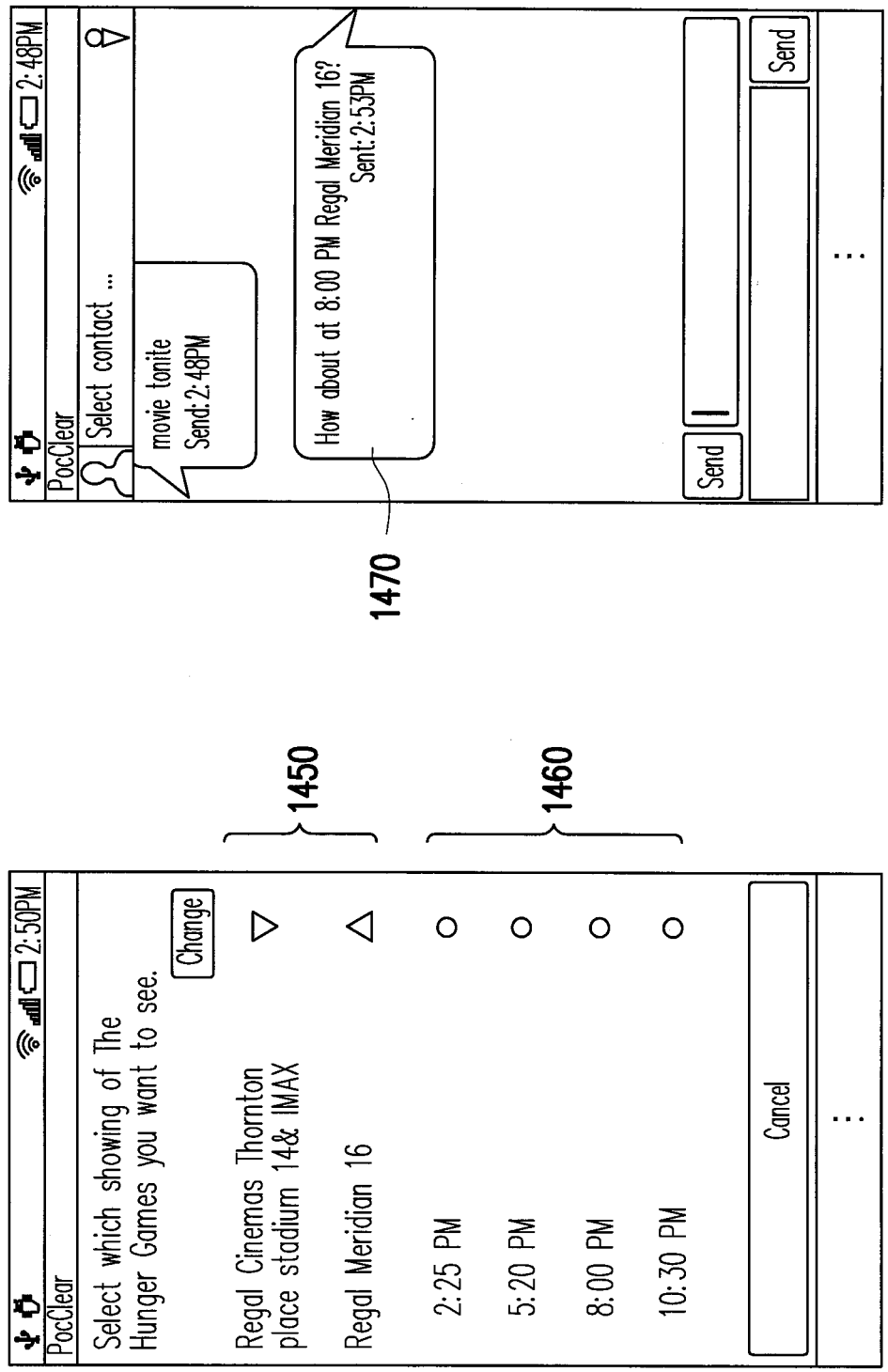

While the user taps the specific icon 1420, the electronic device 100 displays a suggestion UI 1430 as shown in FIG. 14B. In the suggestion UI 1430, four suggestion options 1440 corresponding to four movies are displayed for user selection. Once the user taps one of the suggestion options 1440 (e.g., the suggestion option 1440-*a*), as shown in FIG. 14C, the suggestion options 1450 corresponding to the related theater information and the suggestion options 1460 corresponding to the show time information are displayed. Any suggestion option selected by the user may be regarded as the target option and the corresponding suggestion information (i.e., the movie title, the theater information, and the show time) is transmitted to the second electronic device through a text message 1470 as shown in FIG. 14D. After the electronic device 100 receives a feedback (i.e., the text message 1480 in FIG. 14E) from the second electronic device, the electronic device 100 determines whether the feedback is positive. Assuming that that the feedback is positive, and after the user taps the specific icon 1420, the electronic device 100 displays a suggestion UI 1490 as shown in FIG. 14F. The electronic device 100 provides a suggestion option 1491 for the user to find other movie information, and provides a suggestion option 1493 for the user to save the gathered information to the calendar application installed on the electronic device 100. Assuming that the user taps the option 1493, as shown in FIG. 14G, the electronic device 100 launches the calendar application and display a new event UI 1495, wherein the movie title information, the theater information, and the show time information are displayed in the new event UI 1495. The user only has to tap the option 1497 to save the event to the calendar application.

In the foregoing embodiment, the electronic device 100 provides at least one of the movie title information, the theater information, and the show time information when users mentioned movie on conversation. In another embodiment, the electronic device 100 may also help the users to book a ticket. For example, the electronic device 100 may link to the web page of the theater selected by the user, and then the user may book the ticket through the web page.

Figure 15:
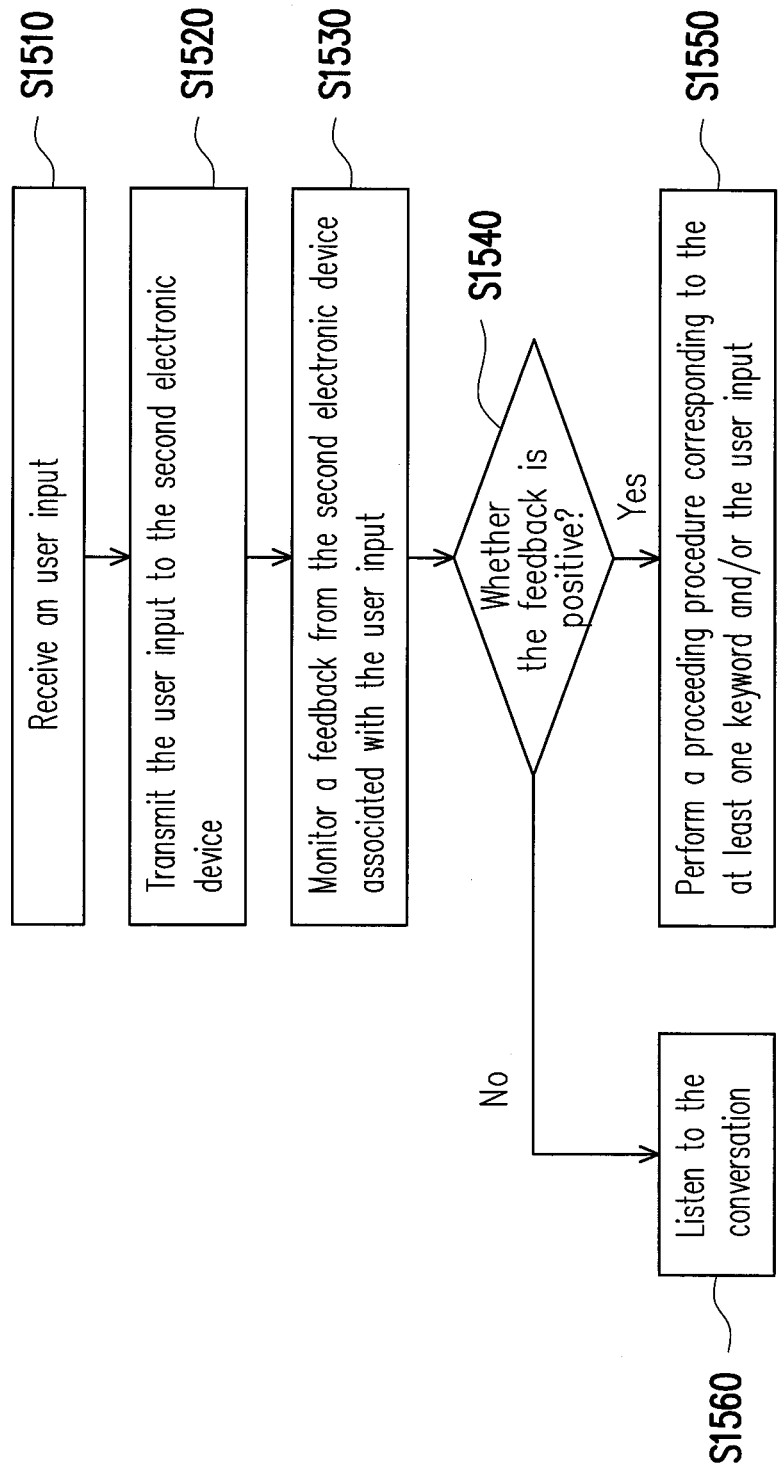

FIG. 15 is a flow chart of using the suggestion information during the conversation according to an embodiment of the present invention. After the at least one suggestion option related to the at least one suggestion information is displayed on the display unit 110 of the electronic device 100, the electronic device 100 receives a user input (step S1510), transmits the user input to the second electronic device (step S1520), and monitors a feedback from the second electronic device associated with the user input (step S1530).

When the electronic device 100 receives the feedback from the second electronic device, in step S1540, the electronic device 100 determines whether the feedback is positive. If the determination result of the step S1540 is negative, in step S1560, the electronic device 100 listens to the conversation continuously.

However, if the determination result of the step S1540 is positive, in step S1550, the electronic device 100 performs a proceeding procedure corresponding to the at least one keyword and/or the user input. The proceeding procedure may be one or the combination of launching a first application installed on the electronic device 100, linking to a web service through the electronic device 100, and storing the user input back to a second application installed on the electronic device 100, wherein the first application, the second application, and the web service are related to the at least one keyword and/or the user input.

FIGS. 16A-16F are schematic views illustrating the visual output while using the suggestion information during the conversation according to an embodiment of the invention. As shown in a conversation UI 1600 in FIG. 16A, after the electronic device 100 receives a text message 1610 from the second electronic device, the electronic device 100 extracts two keywords from the text message 1610, wherein the keywords are an activity (i.e., "dinner") and time (i.e., "tonight" and "19:00"). According to the extracted keywords, the electronic device 100 attempts to obtain the suggestion information from a local database stored in the memory 130. In this embodiment, the local database may be provided by the calendar application installed on the electronic device 100, and the suggestion information may be the available time or the decided schedule information of the user of the electronic device 100.

In this embodiment, the electronic device 100 obtains the decided schedule information stored in the database maintained by the calendar application related to the time extracted from the text message 1610, and displays as a suggestion option 1620 in FIG. 16B.

Figure 16D:
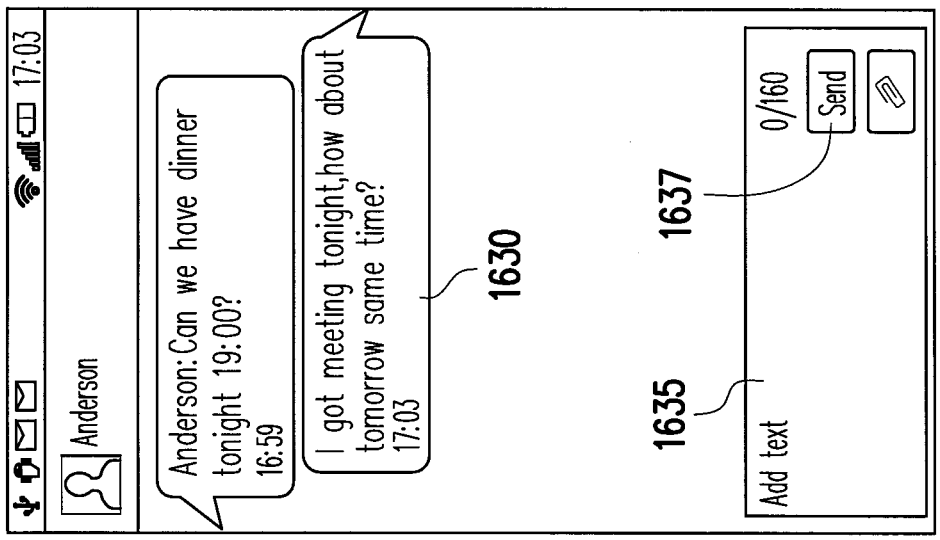
Figure 16E:
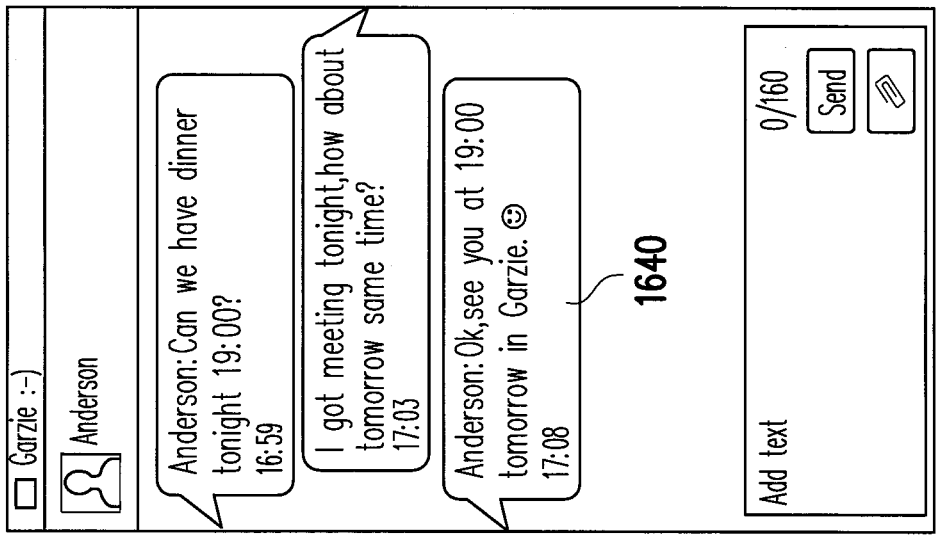
Figure 16F:
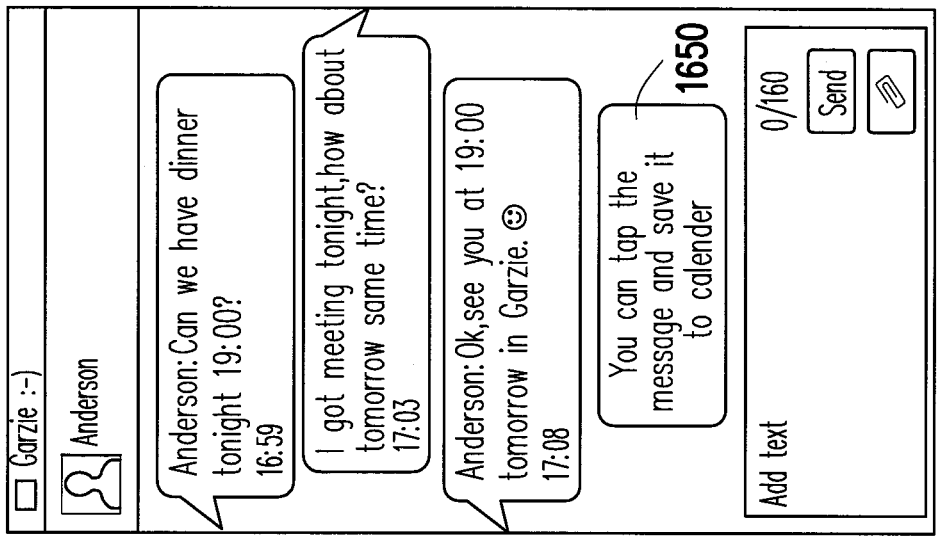

In another embodiment, the electronic device 100 further searches for the available time on another day and displays the available time in a suggestion option 1625 as shown in FIG. 16C. Once the user taps the suggestion option 1625, the available time is entered in the input field 1635 as shown in FIG. 16D, and the user of the electronic device 100 may also enter the other text in the input field 1635. After the user selects the send icon 1637, the text message 1630 including the available time and/or the user input is generated and transmitted to the second electronic device. While the electronic device 100 receives a feedback (e.g., the text message 1640 in FIG. 16E) from the second electronic device, the electronic device 100 determines whether the feedback is positive. In this embodiment, the electronic device 100 determines that the feedback is positive, and as shown in FIG. 16F, the electronic device 100 displays a suggestion option 1650 to hint the user to save the gathered information into the calendar application.

In the foregoing embodiment, the electronic device 100 checks the available (i.e., the time without any appointment) of the user according to the database maintained by the calendar application when mention about the date and/or time on conversation. If agreement of an appointment from conversation is reached, the electronic device 100 provides a suggestion option for the user to save the related information to the database maintained by the calendar application. Alternatively, if the available time are more than one, the electronic device 100 provides a suggestion option list for the user to select and save to calendar application.

The invention also provides a non-transitory storage medium storing a computer program, in which the computer program is composed by a plurality of commands. After the commands are loaded into an electronic device and executed, the electronic device can achieve the effects illustrated in the afore-described embodiments. The non-transitory storage medium may be a read only memory, a random access memory, a magnetic tape, a floppy disk, a hard disk, or an optical disk, which is not to be limited by invention herein.

In view of the above, the present invention provides a method for offering suggestion during conversation, an electronic device using the same, and a non-transitory storage medium, wherein the electronic device acts as an assistant during a conversation between two or more users. The electronic device listens to the conversation without annoying users, analyzes users' conversation and provides a specific icon to hint the user that the suggestion information is available if the conversation satisfies the recommendation criterion. After the user selects the specific icon, the suggestion option will be displayed for helping the users to get the details of the suggestion information needed during the conversation. Thus, users do not have to switch to another application for searching the needed information, and the convenience of having a conversation on the electronic devices can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for offering suggestion during conversation, comprising:
    listening to a conversation on a first electronic device and a second electronic device;
    determining whether the conversation satisfies a recommendation criterion;
    determining whether at least one suggestion information exists in a database if the conversation satisfies the recommendation criterion, wherein the database comprises a local database associated with a plurality of applications installed in the first electronic device;
    displaying at least one suggestion option related to the at least one suggestion information on the first electronic device if the at least one suggestion information related to the associated application exists in the database;
    selecting a target option among the at least one suggestion option by the first electronic device;
    transmitting at least one part of the at least one suggestion information related to the selected target option to the second electronic device by the first electronic device;
    displaying the at least one part of the at least one suggestion information related to the selected target option on both of the first electronic device and the second electronic device;
    monitoring a feedback from the second electronic device associated with the at least one part of the at least one suggestion information related to the selected target option;
    if the feedback is positive, storing the at least one part of the at least one suggestion information related to the selected target option back to one of the applications installed on the first electronic device; and
    if the feedback is negative, continuously listening to the conversation on the first electronic device and the second electronic device.

2. The method of claim 1, wherein the step of determining whether the conversation satisfies the recommendation criterion comprises:
    applying a keyword parsing process on the conversation to identify whether at least one keyword is in the conversation, wherein each of the at least one keyword is a name or an appellation of a person, a date and/or time, an activity, or a place;
    if the at least one keyword is in the conversation, determining whether a sentence having the at least one keyword is a negative sentence;
    if the sentence is not the negative sentence, determining that the conversation satisfies the recommendation criterion.

3. The method of claim 2, wherein the step of determining whether the at least one suggestion information exists in the database if the conversation satisfies the recommendation criterion comprises:
    determining whether the at least one keyword appears in the local database; and
    if the at least one keyword appears in the local database, determining that the at least one suggestion information exists in the database and regarding at least one available information in the local database which is associated with the at least one keyword as the at least one suggestion information.

4. The method of claim 3, wherein the database further comprises a remote database, and after the step of determining whether the at least one keyword appears in the local database, the method further comprising:
    if the at least one keyword does not appear in the local database, determining whether the at least one keyword appears in the remote database; and
    if the at least one keyword appears in the remote database, determining that the at least one suggestion information exists in the database and regarding at least one available information in the remote database which is associated with the at least one keyword as the at least one suggestion information.

5. The method of claim 1, wherein the conversation is an instant messaging conversation, a short message service (SMS) conversation, a multimedia messaging service (MMS) conversation, an email conversation, or a voice conversation.

6. A first electronic device, comprising:
    an input unit;
    a display unit;
    memory;
    one or more processors; and
    one or more programs, wherein the one or more programs are stored in the memory and configured to be executed by the one or more processors, the one or more programs including instructions:
        to listen to a conversation on the first electronic device and a second electronic device;
        to determine whether the conversation satisfies a recommendation criterion;
        to determine whether at least one suggestion information exists in a database if the conversation satisfies the recommendation criterion, wherein the database comprises a local database associated with a plurality of applications installed in the memory;

to automatically launch an associated application among the applications and to display at least one suggestion option related to the at least one suggestion information on a user interface of the associated application on the display unit if the at least one suggestion information related to the associated application exists in the database;

to select a target option among the at least one suggestion option;

to transmit at least one part of the at least one suggestion information related to the selected target option to the second electronic device;

to display the at least one part of the at least one suggestion information related to the selected target option on the display unit and the second electronic device;

to monitor a feedback from the second electronic device associated with the at least one part of the at least one suggestion information related to the selected target option; and if the feedback is positive, to store the at least one part of the at least one suggestion information related to the selected target option back to one of the applications installed on the first electronic device; and if the feedback is negative, continuously to listen to the conversation on the first electronic device and the second electronic device.

7. The first electronic device of claim 6, wherein the instruction determines whether the conversation satisfies the recommendation criterion by applying a keyword parsing process on the conversation to identify whether at least one keyword is in the conversation, determining whether a sentence having the at least one keyword is a negative sentence if the at least one keyword is in the conversation, and determining that the conversation satisfies the recommendation criterion if the sentence is not the negative sentence, wherein each of the at least one keyword is a name or an appellation of a person, a date and/or time, an activity, or a place.

8. The first electronic device of claim 7, wherein the instruction determines whether the at least one suggestion information exists in the database by determining whether the at least one keyword appears in the local database, and determining that the at least one suggestion information exists in the database if the at least one keyword appears in the local database, wherein at least one available information in the local database which is associated with the at least one keyword is regarded as the at least one suggestion information.

9. The first electronic device of claim 8, wherein the database further comprises a remote database, and the instruction further determines whether the at least one keyword appears in the remote database if the at least one keyword does not appear in the local database, and determines that the at least one suggestion information exists in the database if the at least one keyword appears in the remote database, wherein at least one available information in the remote database which is associated with the at least one keyword is regarded as the at least one suggestion information.

10. The first electronic device of claim 6, wherein the conversation is an instant messaging conversation, a short message service (SMS) conversation, a multimedia messaging service (MMS) conversation, an email conversation, or a voice conversation.

11. A non-transitory storage medium, storing a computer program for loading into a first electronic device, the computer program comprising:

commands to listen to a conversation on the first electronic device and a second electronic device;

commands to determine whether the conversation satisfies a recommendation criterion;

commands to determine whether at least one suggestion information exists in a database if the conversation satisfies the recommendation criterion, wherein the database comprises a local database associated with a plurality of applications installed in the first electronic device;

commands to automatically launch an associated application among the applications and to display at least one suggestion option related to the at least one suggestion information on a user interface of the associated application on the first electronic device if the at least one suggestion information related to the associated application exists in the database;

commands to select a target option among the at least one suggestion option by the first electronic device;

commands to transmit at least one part of the at least one suggestion information related to the selected target option to the second electronic device;

commands to display the at least one part of the at least one suggestion information related to the selected target option on both of the first electronic device and the second electronic device;

commands to monitor a feedback from the second electronic device associated with the at least one part of the at least one suggestion information related to the selected target option;

commands to store the at least one part of the at least one suggestion information related to the selected target option back to one of the applications installed on the first electronic device if the feedback is positive; and commands to continuously listen to the conversation on the first electronic device and the second electronic device.

* * * * *